United States Patent
Gueziec et al.

(10) Patent No.: US 6,452,596 B1
(45) Date of Patent: Sep. 17, 2002

(54) METHODS AND APPARATUS FOR THE EFFICIENT COMPRESSION OF NON-MANIFOLD POLYGONAL MESHES

(75) Inventors: Andre P Gueziec, Mamaroneck, NY (US); Frank J Bossen, Plan-les-Ouales (CH); Gabriel Taubin, Hartsdale, NY (US); Claudio Silva, Mahwah, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,833

(22) Filed: Apr. 22, 1999

Related U.S. Application Data

(60) Provisional application No. 60/103,217, filed on Oct. 6, 1998.

(51) Int. Cl.$^7$ ............................................. G06T 11/20
(52) U.S. Cl. ................................................... 345/440
(58) Field of Search ................................. 345/440, 441

(56) References Cited

U.S. PATENT DOCUMENTS

| | | | | |
|---|---|---|---|---|
| 5,825,369 A | * | 10/1998 | Rossignac et al. | 345/440 |
| 5,966,140 A | * | 10/1999 | Popovic et al. | 345/441 |
| 6,016,153 A | * | 1/2000 | Gueziec et al. | 345/441 |
| 6,031,548 A | * | 2/2000 | Gueziec et al. | 345/440 |
| 6,184,897 B1 | * | 2/2001 | Gueziec et al. | 345/440 |
| 6,307,551 B1 | * | 10/2001 | Gueziec et al. | 345/419 |

OTHER PUBLICATIONS

"Geometry Compression", Michael Deering, Aug. 1995, SIGGRAPH, Proceeding of the 22nd Annual ACM Conference on Computer Graphics, pp. 13–20.*

Slattery, M.J. et al., "The Qx–coder", IBM J. Res. Develop., vol. 42, No. 6, 11/98, pp. 767–784.

Gueziec, A. et al., "Converting Sets of Polygons to Manifold Surfaces by Cutting and Stitching", IEEE, 10/98, pp. 383–390.

Popovic, J. et al., "Progressive Simplicial Complexes", Proceedings of ACM, SIGGRAPH 1997, 4 pages.

Butlin et al., "CAD Data Repair", 5$^{th}$ International Meshing Roundtable, Pittsburgh, PA, Oct. 1996, 6 pages.

Gueziec, A., "Surface Simplification with Variable Tolerance", MRCAS '95, Nov. 4, 1995, 4 pages.

Szeliski, R. et al., "Curvature and Continuity Control in Particle–Based Surface Models", SPIE, vol. 2031 Goemetric Methods in Computer Vision II, 1993, 10 pgs.

Welch, W. et al., "Free–Form Shape Design Using Triangulated Surfaces", Proceedings of ACM SIGGRAPH '95, Jul. 1994, pp. 247–256.

Guezie, A., "Surface Simplification Inside a Tolerance Volume", IBM RC 20440 (90101), May 20, 1997, 56 pgs.

Gueziec, A. et al., "Cutting and Stitching: Efficient Conversion of a Non–Manifold Polygonal Surface to a Manifold", IBM RC 20935(92693), Jul. 25, 1997, 32 pgs.

Taubin, G. et al., "Geometric Compression Through Topological Surgery", IBM RC 20340(89924), Jan. 16, 1996, 22 pages.

* cited by examiner

*Primary Examiner*—Jeffery Brier
*Assistant Examiner*—Ryan Yang
(74) *Attorney, Agent, or Firm*—Louis J. Percello, Esq.; Perman & Green, LLP

(57) ABSTRACT

A method for encoding a non-manifold polygonal mesh operates by converting an original (non-manifold) model to a manifold model, encoding the manifold model using a mesh compression technique, and clustering, or stitching together during a decompression process, vertices that were duplicated earlier to faithfully recover the original connectivity. By separating the connectivity from model geometry and properties, the method avoids encoding vertices (and properties bound to vertices) multiple times. This provides a reduction in the size of the bit-stream compared with encoding the model as a manifold.

19 Claims, 20 Drawing Sheets

FOR EACH MANIFOLD CONNECTED COMPONENT:
1. CONNECTIVITY
2. STITCHES
3. GEOMETRY AND PROPERTIES
FIG.1D
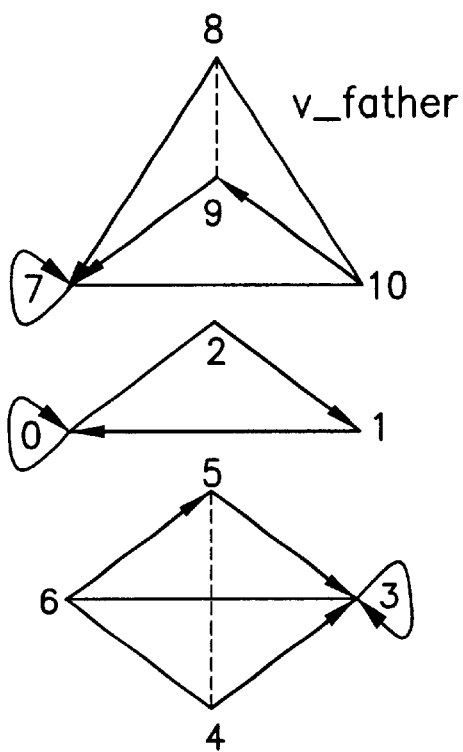
FIG.2A
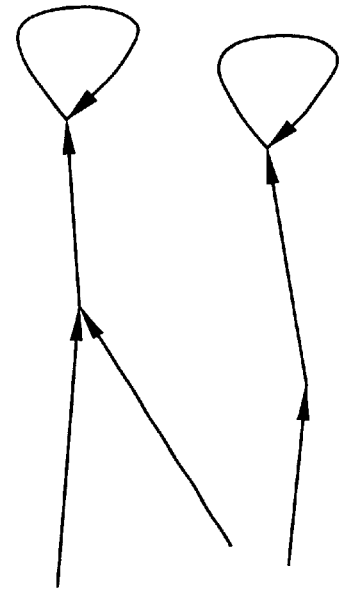
FIG.2B

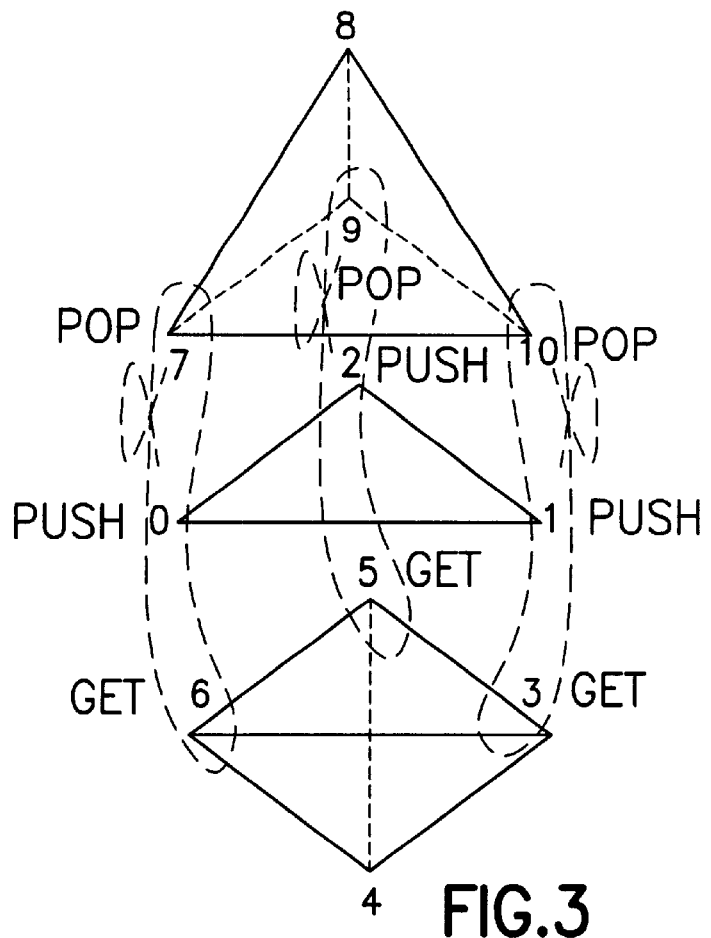
FIG.3
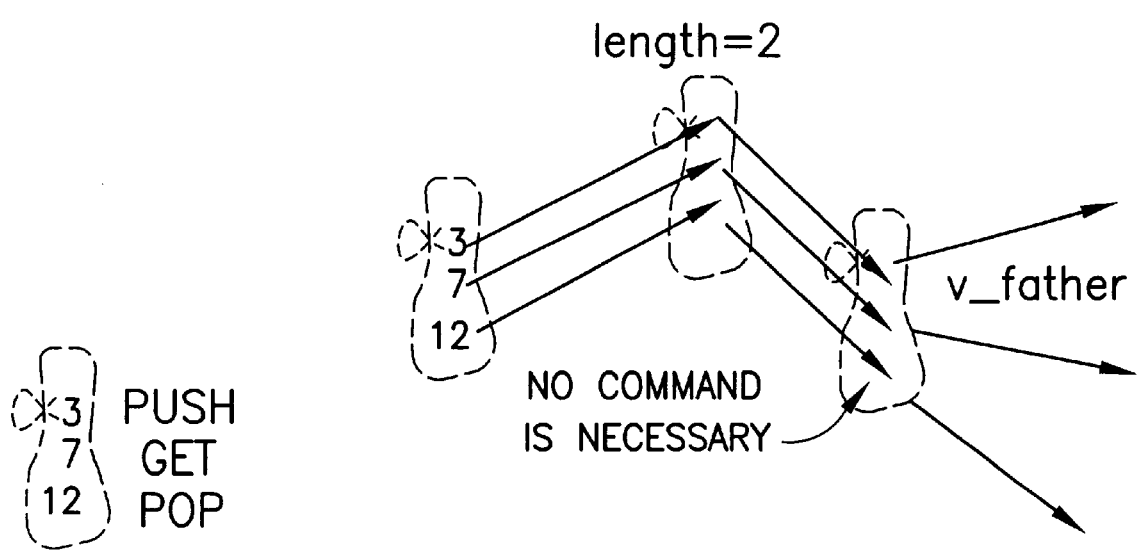
FIG.4A
FIG.4B

- STITCH ALONG A v_father FOREST
  - ▶ (WHICH COMES FROM THE VERTEX GRAPH)
  - ▶ COULD BE DIFFERENTLY DEFINED

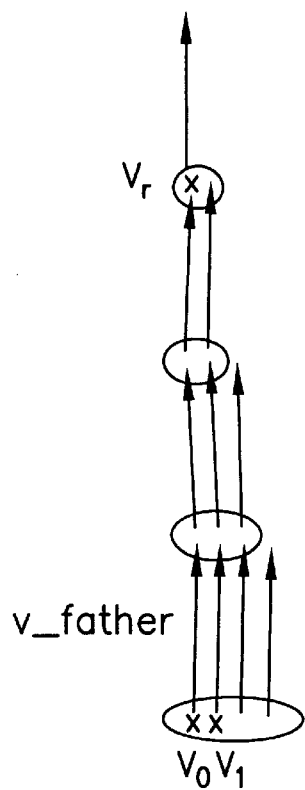
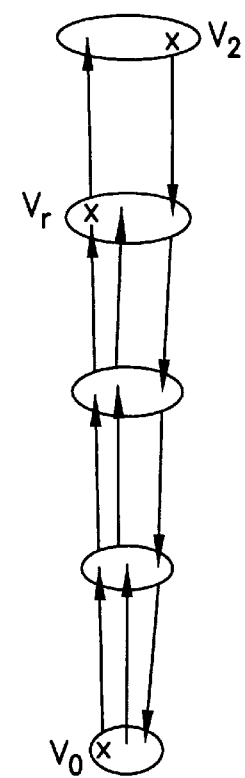
FIG.6A  FIG.6B
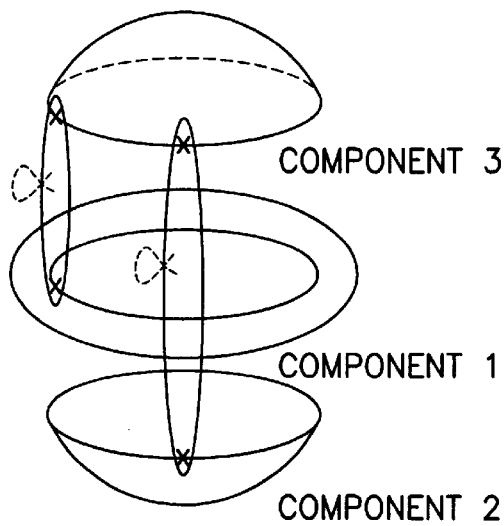
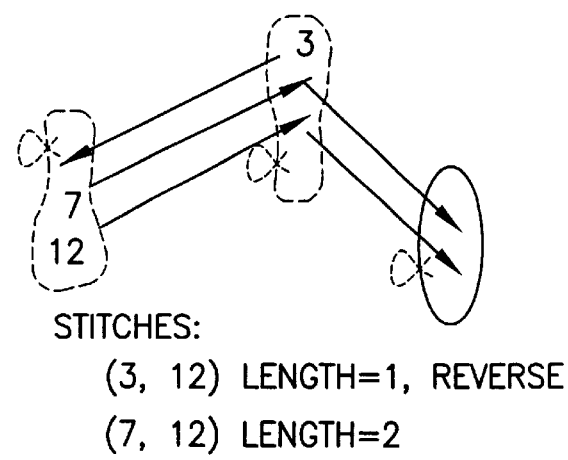
FIG.7A  FIG.7B

| COMMAND | stitching_command | pop_or_get | pop | stitch_length | stack_index | differential_length | push_bit | reverse_bit[1] |
|---|---|---|---|---|---|---|---|---|
| NONE | 0 | | | | | | | |
| PUSH | 1 | 0 | | x | | | | |
| GET | 1 | 1 | 0 | | x | x | x | x |
| POP | 1 | 1 | 1 | | x | x | x | x |
[1] unless stitch_length+differential_length=0
FIG.8
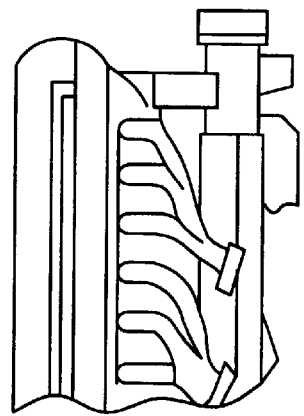
FIG.12A
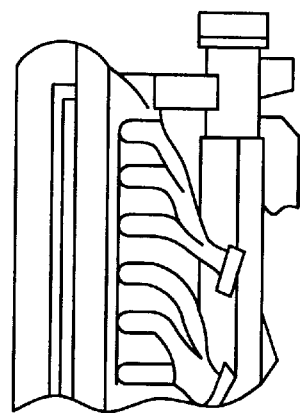
FIG.12B

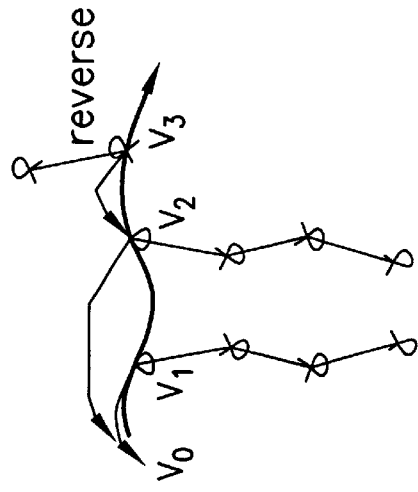
FIG. 9A
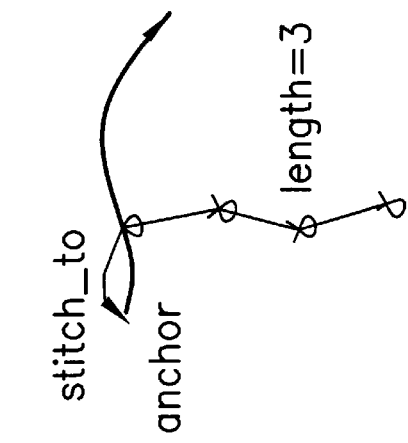
FIG. 9B
| VERTEX | COMMAND | stitch_length | stack_index | differential_length | push_bit | reverse_bit |
|---|---|---|---|---|---|---|
| $V_0$ | PUSH | 3 | | | | |
| $V_1$ | GET | | index of $V_0$ | 0 | false | false |
| $V_2$ | POP | | index of $V_0$ | 0 | true | false |
| $V_3$ | POP | | index of $V_2$ | -2 | false | true |
FIG. 9C bart.wrl briggso.wrl engine.wrl enterprise.wrl gen_nm.wrl lamp.wrl maze.wrl opt-COW.wrl sierpinski.wrl tetra2nm.wrl planet0.wrl superfemur.wrl saturn.wrl symmetric-brain.wrl

| VERTEX | COMMAND | stitch _length | stack _index | differential _length | push _bit | reverse _bit |
|---|---|---|---|---|---|---|
| 0 | PUSH | 0 | | | | |
| 1 | PUSH | 1 | | | | |
| 5 | POP | | 1 | 0 | 0 | 0 |
| 6 | POP | | 0 | 0 | 1 | 0 |
| 0 | POP | | 0 | 2 | 0 | 1 |

TABLE 1

FIG.13

| NON-MANIFOLD MODEL | STACK-BASED ENCODER BIT-STREAM SIZE IN BYTES | VARIABLE-LENGTH ENCODER | SIZE RATIO |
|---|---|---|---|
| Bart.wrl | 7,245 | 7,243 | 1.0003 |
| Briggso.wrl | 4,100 | 4,080 | 1.005 |
| Gen_nm.wrl | 2,566 | 2,566 | 1 |
| Lamp.wrl | 3,904 | 3,726 | 1.05 |
| Maze.wrl | 4,278 | 4,235 | 1.01 |
| Planet0.wrl | 82 | 82 | 1 |
| Saturn.wrl | 2,087 | 1,998 | 1.045 |
| Sierpinski.wrl | 193 | 193 | 1 |
| Superfemur.wrl | 30,971 | 30,964 | 1.0002 |
| Symmetric_brain.wrl | 73,839 | 73,789 | 1.0007 |
| Tetra2nm.wrl | 67 | 66 | 1.015 |

TABLE 3

FIG.15

| MODEL | UNCOMPRESSED SIZE BYTES | NUMBER OF VERTICES | NUMBER OF TRIANGLES |
|---|---|---|---|
| Bart.wrl | 392,030 | 5,056 | 9,000 |
| Briggso.wrl | 130,297 | 1,584 | 3,160 |
| Engine.wrl | 4,851,671 | 63,528 | 132,807 |
| Enterprise.wrl | 859,388 | 12,580 | 12,609 |
| Gen_nm.wrl | 49,360 | 410 | 820 |
| Lamp.wrl | 254,043 | 2,810 | 5,054 |
| Maze.wrl | 87,391 | 1,412 | 1,504 |
| Opt_cow.wrl | 204,420 | 3,078 | 5,804 |
| Planet0.wrl | 1,656 | 8 | 12 |
| Saturn.wrl | 61,155 | 770 | 1,536 |
| Sierpinski.wrl | 4,702 | 34 | 64 |
| Superfemur.wrl | 1,241,052 | 14,065 | 28,124 |
| Symmetric_brain.wrl | 3,092,371 | 34,416 | 66,688 |
| Tetra2nm.wrl | 489 | 5 | 7 |

| FIG.14A | FIG.14B |
|---|---|

| COMPRESSED AS NON-MANIFOLD | | | COMPRESSED AS MANIFOLD | NON-MANIFOLD VS MANIFOLD | |
|---|---|---|---|---|---|
| BYTES | BPV | BPT | BYTES | RATIO | SAVING |
| 7,243 | 11.46 | 6.43 | 8,105 | 0.89 | 11% |
| 4,080 | 20.61 | 10.32 | 4,129 | 0.98 | 2% |
| 148,601 | 18.71 | 8.95 | 167,379 | 0.89 | 11% |
| 28,224 | 17.95 | 17.91 | 29,553 | 0.95 | 5% |
| 2.566 | 50.06 | 25.03 | 2625 | 0.97 | 3% |
| 3,726 | 10.61 | 5.90 | 3954 | 0.94 | 6% |
| 4,235 | 24.0 | 22.53 | 4855 | 0.87 | 13% |
| 7,006 | 18.02 | 9.66 | 7,006 | 1 | 0% |
| 82 | 82 | 54.6 | 96 | 0.85 | 15% |
| 1,998 | 20.75 | 10.40 | 2,197 | 0.91 | 9% |
| 193 | 45.64 | 24.12 | 252 | 0.76 | 4% |
| 30,964 | 17.61 | 8.81 | 31,378 | 0.98 | 2% |
| 73,789 | 17.15 | 8.85 | 73,640 | 1.002 | -0.2% |
| 66 | 105.6 | 75.42 | 83 | .79 | 21% |

FIG.14B

| NON-MANIFOLD MODEL | ENCODING | DECODING | VERTICES | TRIANGLES |
| --- | --- | --- | --- | --- |
| | CPU TIME IN SECONDS | | DECODED/SECOND | |
| Bart.wrl | 0.64 | 0.38 | 13,300 | 23,700 |
| Briggso.wrl | 0.24 | 0.14 | 11,300 | 22,600 |
| Engine.wrl | 12.35 | 7.88 | 8,100 | 16,900 |
| Enterprise.wrl | 1.29 | 1.12 | 11,200 | 11,300 |
| Gen_nm.wrl | 0.10 | 0.04 | 10,300 | 20,500 |
| Lamp.wrl | 0.39 | 0.25 | 11,200 | 20,200 |
| Maze.wrl | 0.18 | 0.12 | 11,800 | 12,500 |
| Cow.wrl | 0.43 | 0.23 | 13,400 | 25,200 |
| Planet0.wrl | 0.02 | 0.02 | 400 | 600 |
| Saturn.wrl | 0.14 | 0.08 | 9,600 | 19,200 |
| Sierpinski.wrl | 0.03 | 0.02 | 1,700 | 3,200 |
| Superfemur.wrl | 2.12 | 1.36 | 10,300 | 20,700 |
| Symmetric_brain.wrl | 7.34 | 3.20 | 10,800 | 20,800 |
| Tetra2nm.wrl | 0.02 | 0.02 | 250 | 350 |

FIG.16

| NONE PUSH | 0 | |
|---|---|---|
| | 10 LENGTH AS UNSIGNED INT | DIFFERENTIAL PUSH BIT REVERSE BIT[1] LENGTH AS SIGNED INT |
| GET | 110 DEPTH AS UNSIGNED INT | DIFFERENTIAL PUSH BIT REVERSE BIT[1] LENGTH AS SIGNED INT |
| POP | 111 DEPTH AS UNSIGNED INT | |

FIG.21

[1] UNLESS LENGTH+DIFFERENTIAL LENGTH=0

METHODS AND APPARATUS FOR THE EFFICIENT COMPRESSION OF NON-MANIFOLD POLYGONAL MESHES

CLAIM OF PRIORITY FROM A COPENDING PROVISIONAL APPLICATION

This patent application claims priority under 35 U.S.C. §119(e) from copending Provisional Patent Application No.: 60/103,217, filed Oct. 6, 1998, entitled "Method for Compressing Non-Manifold Meshes" by Frank J. Bossen et al., the disclosure of which is incorporated by reference herein in its entirety.

FIELD OF THE INVENTION

This invention relates to the field of computer graphics and, in particular, to methods for compressing, storing and processing data representative of surfaces.

BACKGROUND OF THE INVENTION

Polygonal surfaces form one of the major representations of three dimensional geometric models. Such surfaces consist of a plurality of polygons, which are cycles of vertices, whose coordinates are usually expressed in a local coordinate system. Such polygonal surfaces may be used for generating various images, pictures, and animations, and may also be used in CAD systems, in scientific visualization systems, and in medical imaging systems, as well as in manufacturing, architectural, geographic information, warfare simulation, robotics and entertainment industries systems. In particular, polygons (especially, triangles) are required for generating three-dimensional renderings using available graphics architecture.

In general, polyhedral surfaces, such as surfaces represented as triangles, are commonly represented in a computer memory with a "vertex array" (with three floating point numbers per vertex) and a "triangle array" (with three indices into the vertex array per triangle). Very often this representation allows for the surface to be non-manifold, i.e., to have either one or both of singular vertices or edges. A vertex is singular if its star (the set of triangles incident to the vertex) is not topologically equivalent (continuously deformed) to a closed disk. An edge is singular if it is shared by more than two triangles. However, many geometric algorithms and operations, such as compression, simplification, smoothing, and deformation operations, require the surface to be manifold.

There are a number of known algorithms that operate on polygonal surfaces including, but not limited to, the following. A first type of algorithms are those that produce two dimensional graphics for display on computer screens, for printing, or for other purposes. These algorithms are typically implemented using both software and hardware components. A second type of algorithms are those that compute surface characteristics (e.g. curvature, area). A third type of algorithms are those used for filtering, such as smoothing algorithms and other filtering algorithms. A fourth type of algorithms are those that perform finite element analysis for various engineering applications. A fifth type of algorithms are those that simplify surfaces, either because the surfaces are too large for available hardware to process in a reasonable period of time, or for efficiency purposes. In this context "simplifying" means approximating the surface with another surface that contains fewer polygons. An example of such a simplification algorithm is described in commonly assigned U.S. Patent Application entitled "Surface Simplification Preserving a Solid Volume and Respecting Distance Tolerances", Ser. No. 08/742,641, filed Nov. 1, 1996, by André P. Guéziec. A sixth type of algorithms are those used for surface subdivision, wherein surface subdivision is considered to be a technique for introducing new polygons into the surface so as to produce a result that resembles a smooth surface. A seventh type of algorithms are those used for surface compression, wherein surface compression is considered to be a technique to provide an efficient encoding of polygons defining the surface. An example of a surface compression algorithm is described by Rossignac et al. in U.S. Pat. No. 5,825,369 entitled "Compression Of Simple Geometric Models Using Spanning Trees." In the Rossignac et al. method, the vertices of the mesh are organized as a spanning forest, the spanning forest being composed of one or more rooted trees, each rooted tree spanning the vertices of one connected component of the manifold mesh. The spanning forest can be described by a v_father array, with j=v_father[i] indicating that the j-th vertex is the father of the i-th vertex, with i and j being indices corresponding with the order of traversal of the vertex forest. If the i-th vertex is the root of a tree in the vertex forest, then v_father[i]=i. Most available algorithms of the foregoing categories, with the exception of the first category (A), require that the surface be a manifold surface. To understand the concept of a manifold surface one can consider a solid object, and the surface bounding that solid object. The bounding surface is a manifold surface, together with surfaces obtained after cutting a series of holes in the original surface. A precise definition of a surface, and of a manifold surface, are given below.

The following three situations can arise when an algorithm that requires that the surface be a manifold surface is instead presented with a surface that is not a manifold surface. First, the algorithm can include a method for rejecting the presented surface. However, there is an additional cost incurred in designing and implementing the input surface rejection method. Second, the algorithm may not recognize that the presented surface is a non-manifold surface, but safeguards allow the computer program implementing the algorithm to terminate properly, without performing the original function of the algorithm. In this case there is an additional cost incurred in designing and implementing the safeguards. Third, the computer program implementing the algorithm may simply terminate abnormally. This latter case is undesirable for a number of reasons.

Conventional methods for converting non-manifold surfaces to manifold surfaces include three techniques, described by Szeliski et al. "Curvature and Continuity Control in Particle-Based Surface Models", Proceedings of SPIE "Geometric Methods in Computer Vision II", Vol 2031-15, July 1993, pp.172–181, by Welch and Witkin "Free-Form Shape Design Using Triangulated Surfaces", Proceedings of ACM SIGGRAPH'95, July 1994, pp.247–256, and by Butlin et al. "CAD Data Repair", in 5th International Meshing Roundtable, Pittsburgh, Pa., October 1996.

The technique of Szeliski et al. builds a new polygonal surface from an existing surface by defining a collection of point samples, using point repulsion methods to distribute the points evenly. Subsequently, a surface triangulation of the remaining points is found by extending the techniques of Delaunay triangulations to surfaces. Delaunay triangulations are discussed by O'Rourke in "Computational geometry in C", Cambridge University Press, 1994. The method of Szeliski et al. produces surfaces that are manifolds, but at the expense of discarding the original surface geometry (vertex positions) and connectivity (triangles or polygons), by defining entirely new vertices and triangles. Furthermore, the triangulation method employed is a heuristic method that most likely does not apply in all cases.

The technique of Welch et al. builds a polygonal surface starting from a simple surface, by applying a series of surface operations that consist of adding, deleting, or morphing a portion of the surface. This technique uses methods similar to Szeliski et al. for building triangulations of the surface points. Surface or mesh cutting techniques are also used, but the mesh cutting techniques cut only along simple curves, and are not capable of multiplying vertices at complex curve intersections.

The technique of Butlin et al. is directed towards the conversion of CAD data. This technique is interactive and requires user assistance, and automatic methods for detecting and converting vertices where non-manifold situations occur are not described.

An improved technique for converting a non-manifold surface to a manifold surface is described in commonly assigned U.S. patent application Ser. No. 08/840,001, filed Apr. 24, 1997, entitled "Method to Convert Non-Manifold Polyhedral Surfaces into Manifold Surfaces", by André Guéziec and Gabriel Taubin, the disclosure of which is incorporated by reference herein in its entirety.

Turning now to the compression of polygonal surfaces, which is of most interest to the teachings of this invention, the most efficient polygonal compression methods currently available are restricted to a manifold mesh. These techniques require a conversion process, and fail to retrieve the original model connectivity after decompression.

The sizes of polygonal meshes have been steadily increasing, and there is no indication that this trend will change. For example, a polygonal model representing a Boeing 777 airplane contains on the order of 1 billion polygons, excluding polygons associated with the rivet models. Geometry compression deals with the compression of polygonal meshes for transmission and storage. Many real-world polygonal meshes are non-manifold, that is, they contain topological singularities, (e.g. edges shared by more than two triangles). In fact, on a database of 300 meshes used for MPEG-4 core experiments and obtained from the World Wide Web, it was discovered that more than half of the meshes were non-manifolds. As was indicated previously, most of the methods currently available for geometry compression require a manifold connectivity. Meshes can be converted, but then the original connectivity is lost.

At present, the inventors are aware of but one published report dealing with connectivity-preserving non-manifold mesh compression, i.e., J. Popovic and H. Hoppe, "Progressive simplical complexes", in Siggraph, pages 217–224, Los Angeles, August 1997, ACM (referred to hereafter as Popovic and Hoppe). However, this technique does not appear to be efficient, as discussed in greater detail below.

Hoppe's Progressive Meshes (H. Hoppe, "Efficient implementation of progressive meshes", Computer and Graphics, 22(1):27–36, 1998) uses a base mesh and a series of vertex insertions (specifically, inverted edge contractions) to represent a manifold mesh. While the main functionality is progressive transmission, the encoding is fairly compact, using 30 to 50 bits per vertex with arithmetic coding. Utilizing more general vertex insertion strategies, this method was extended by Popovic and Hoppe to represent arbitrary simplicial complexes, manifold or not, using about 50 bits per vertex (asymptotically the cost of this method is proportional to n log n, n being the number of vertices).

M. Deering in "Geometry compression", Siggraph '95 Conference Proceedings, pages 13–20, Los Angeles, August 1995, introduced geometry compression methods, originally to alleviate 3D graphics rendering limitations due to a bottleneck in the transmission of information to the graphics hardware (in the bus). Deering's method uses vertex and normal quantization, and exploits a stack-buffer to reuse a number of vertices recently visited and to avoid resending them. Deering's work fostered research on 3D mesh compression for other applications. For example, M. Chow, "Optimized geometry compression for real-time rendering", Visualization 97, pages 415–421, Phoenix, Ariz., October 1997, IEEE, extended Deering's work with efficient generalized triangle-strip building strategies.

Reference to a method for compressing triangular meshes can also be found in U.S. Pat. No. 5,870,094 to Deering entitled "System And Method For Transferring Compressed Three-Dimensional Graphics Data."

Deering's method requires splitting a non-manifold mesh. As such, the connectivity of the original model is lost, and vertices are generally sent multiple times.

G. Taubin, H. Horn, F. Lazarus, and J. Rossignac (referred to hereafter as G. Taubin et al.) in "Geometry coding and vrml", Proceedings of the IEEE, 96(6):1228–1243, June 1998, describe a Topological Surgery singe-resolution mesh compression method that represents a connected component of a manifold mesh as a tree of polygons (which are each temporarily decomposed into triangles during encoding and subsequently recovered after decoding). The tree is decomposed into runs, whose connectivity can be encoded at a very low cost. To recover the connectivity and topology, the tree is completed with a vertex tree, providing information to merge triangle edges. The method of G. Taubin et al. also encodes the vertex coordinates (geometry) and all property bindings defined in VRML'97 ("The Virtual Reality Modelling Language Specification", VRML'97 Specification, http://www.vrml.org/Specification/VRML97.)

C. Touma and C. Gotsman in "Triangle mesh compression", Proceedings Graphics Interface, pages 26–34, 1998, traverse a triangular (or polygonal) mesh and remove one triangle at a time, recording vertex valences as they go, and recording triangles for which a boundary is split in two as a separate case.

S. Gumhold and W. Strasser, "Real time compression of triangle mesh connectivity", in Siggraph'98 Conference Proceedings, pages 133–140, Orlando, July 1998 and J. Rossignac, "Edgebreaker:Compressing the incidence graph of triangle meshes, Technical Report GIT-GVU-98-35, Georgia Institute of Technology, 1998, http://www.cc.gatech.edu/gvu/reports/1998 concentrate on encoding the mesh connectivity, and use mesh traversal techniques similar to those used by C. Touma and C. Gotsman, but instead of recording vertex valences, consider more cases depending on whether triangles adjacent to the triangle that is being removed have already been visited. Another relevant work for connectivity compression is one by M. Denny and C. Sohler, "Encoding and triangulation as a permutation of its point set", in Proc. of the Ninth Canadian Conference of Computational Geometry, pages 39–43, August 1997.

J. Li and C. C. Kuo, "Progressive coding of 3D graphics models", Proceedings of the IEEE, 96(6):1052–1063, June 1998, present a "dual graph" approach that traverses polygons of a mesh in a breadth-first fashion, and uses special codes to merge nearby (topologically close) polygons (serving the same purpose as the vertex graph in the approach of G. Taubin et al.) and special commands to merge topologically distant polygons (to represent a general connectivity, and not only a disk).

Finally, C. Bajaj et al., "Single resolution compression of arbitrary triangular meshes with properties", in Proceedings of Data Compression Conference, 1999, TICAM Report Number 99-05, provide a "dag of ring" mesh compression approach that partitions meshes in vertex and triangle layers that can represent a non-manifold mesh. However, only results on manifold meshes were reported.

OBJECTS AND ADVANTAGES OF THE INVENTION

It is a first object and advantage of this invention to provide an improved connectivity-preserving non-manifold mesh compression technique that improves over the known conventional technique.

It is a second object and advantage of this invention to provide an improved connectivity-preserving non-manifold mesh compression technique that offers an increased efficiency by achieving significantly lower bit-rates (per vertex) and reduced encoding time.

SUMMARY OF THE INVENTION

The foregoing and other problems are overcome and the objects of the invention are realized by methods and apparatus in accordance with embodiments of this invention.

A method of the present method operates by converting an original model to a manifold model, encoding the manifold model using a mesh compression technique, and clustering, or stitching together during a decompression process, vertices that were duplicated earlier to faithfully recover the original connectivity.

The description focuses on efficiently encoding and decoding the stitching information. By separating the mesh connectivity from mesh geometry and properties, the method avoids encoding vertices (and the properties bound to vertices) multiple times. This provides a reduction in the size of the bit-stream compared with encoding the model as a manifold. Such mesh properties can generally include color, texture coordinates and normals, and the properties can be expressed and encoded per mesh vertex/face/corner.

Described herein is a method for compressing non-manifold polygonal meshes and recovering their exact connectivity (and topology) after decompression. The inventive method compares in compression efficiency and speed with the most efficient manifold-mesh compression methods, thus overcoming the deficiencies in the Popovic et al. approach, and furthermore allows efficiency gains by avoiding duplicate encodings of vertex coordinates and properties.

The method in accordance with the teachings of this invention operates by converting the original mesh to a set of manifold meshes, encoding the manifold meshes using a desired mesh compression technique, and clustering, or stitching together during the decompression process, the vertices that were duplicated earlier to faithfully recover the original connectivity. There is significant flexibility in the strategies used for converting to manifolds meshes and compressing them, and the present method does not require using any specific one. A vertex clustering is recorded during the conversion process, such that when applied to the manifold meshes, the original non-manifold mesh is recovered.

This invention also provides a program storage device that is readable by a machine, the program storage device tangibly embodying a program of instructions executable by the machine to perform method steps for encoding a non-manifold polygonal mesh. In this method there are steps of (a) representing the non-manifold polygonal mesh as a plurality of manifold polygonal meshes and a vertex clustering array obtained by cutting through singular edges and vertices of the non-manifold polygonal mesh; (b) representing each connected component of the manifold polygonal meshes with a vertex graph, a triangle tree, and a triangle data record; (c) representing the information contained in the vertex cluster array as stitching information comprised a set of stitching commands each of the type NONE, PUSH, GET or POP, each stitching command having associated data; and (d) applying the stitching information to a vertex cluster look-up table for describing a relation between polygon boundary loop nodes and mesh vertices. This method further includes a step of encoding the stitching information in a bit-stream according to a predetermined bit-stream syntax, the bit-stream syntax being comprised of, for each vertex of the manifold polygonal mesh, one of the stitching commands having the type NONE, PUSH, GET or POP; a stitch length; a stack index; a differential length; a push bit; and a reverse bit.

In general, there is taught an efficient method for compressing a non-manifold mesh. This method has steps of (a) converting the non-manifold mesh to a manifold mesh, the step of converting including a step of storing information on how to cluster vertices; (b) compressing the manifold mesh; and (c) compressing the information on how to cluster vertices.

BRIEF DESCRIPTION OF THE DRAWINGS

The above set forth and other features of the invention are made more apparent in the ensuing Detailed Description of the Invention when read in conjunction with the attached Drawings, wherein:

FIG. 1D illustrates an overall presently preferred compressed syntax for the non-manifold mesh (FIGS. 1A, 1B, 1C and 1D may be collectively referred to below as FIG. 1);

FIG. 2A illustrates a v_father for Topological Surgery for the example of FIG. 1, while FIG. 2B depicts a v_father for a particular case of Topological Surgery, where v_father is a forest that also admits self-loops (the drawing of self-loops is omitted);

FIG. 3 illustrates a stack-based method applied to the example of FIG. 1;

FIG. 4A shows the stack-based method requiring one command for each vertex that is clustered;

FIG. 4B shows a variable-length method, wherein the specification of a length can eliminate several commands;

FIGS. 5A–5D are diagrams illustrating a preferred embodiment of the present invention using stitches to encode a vertex clustering, and these Figures show that three stitches of variable length and direction can encode the vertex clustering of FIG. 1;

FIGS. 6A and 6B generally depicts a technique for computing the longest possible stitch starting at a vertex $v_0$, where ovals indicate clusters, where FIG. 6A shows a forward stitch of length 3 with $v_1$; and FIG. 6B shows backward stitch of length 4 with $v_2$;

FIGS. 7A and 7B generally illustrates potential problems with variable-length stitches, where FIG. 7A illustrates that clustering between components 1 and 2 is decoded only when component 3 is decoded; and where FIG. 7B illustrates that to successfully encode these two stitches one must substitute Vertices 12 with 7;

FIG. 8 illustrates a syntax for stitches, where the X symbols indicate variables associated with each command;

FIGS. 9A–9C depict the translating of stitches to a bit-stream syntax;

FIG. 12A shows an exemplary engine model before compression, while FIG. 12B shows the engine model after decompression;

FIG. 13 shows a Table 1 illustrating five commands (different from NONE) encoding the complete clustering of FIG. 1 (the stack-based encoding shown in FIG. 3 requires nine);

FIG. 14 shows a Table 2 illustrating compression results, where "bpv" represents "bits per vertex" and bpt represents "bits per triangle";

FIG. 15 illustrates a Table 3 that compares the efficiency of the variable-length encoder vs. the stack-based encoder, where the total bit-stream sizes are in bytes, and where 1% to 5% percent of the total bit-stream size represents a significant proportion of the connectivity (if not all of it) and is thus very significant for stitches;

FIG. 16 illustrates a Table 4 of encoding and decoding times in seconds measured using a 233 MHz computer;

FIG. 21 is a block diagram of a data structures used by a stitching command.

DETAILED DESCRIPTION OF THE INVENTION

As will be made apparent below, the present invention teaches methods and apparatus for compressing and decompressing non-manifold meshes, while preserving the original connectivity of the mesh. This is important to do for at least the following reasons.

First, the connectivity affects rendering and further processing of the meshes. For example, if the surface is smoothed, a radically different result will be obtained if the mesh was split in different manifold portions.

Second, the size of the bit-stream is generally lowered by encoding non-manifold meshes directly, as opposed to splitting them (experimentally up to 20%), because singular vertices are not multiply encoded.

In accordance with the present invention, a non-manifold mesh is represented as a manifold mesh and one or more stitches.

Figure 1A:
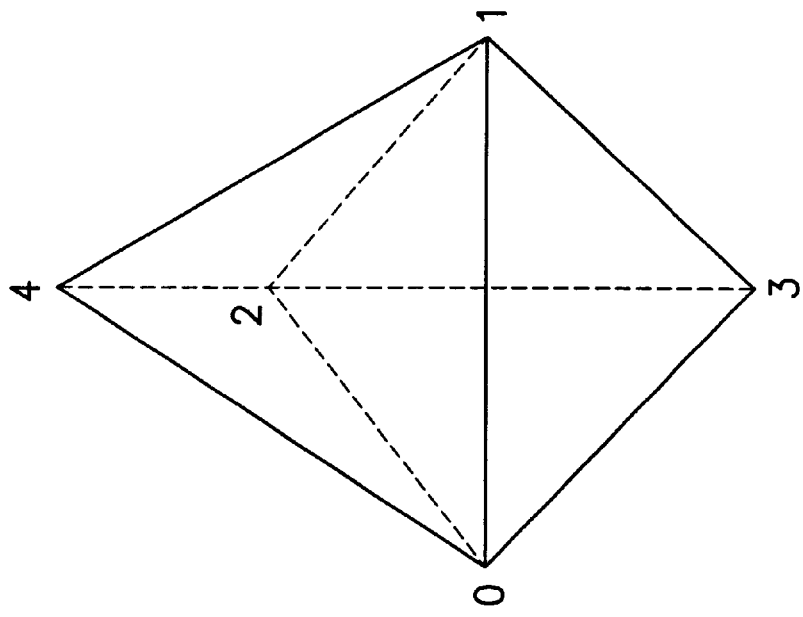
FIG. 1A depicts a conventional non-manifold model wherein two tetrahedra of a non-manifold mesh share a face.

As an introduction to the teachings of this invention, a representation for compression will first be discussed. A basic idea is to encode both the manifold meshes and vertex clustering as a substitute for the non-manifold mesh. While at first glance this idea might appear to self-evident, efficiently encoding and decoding a vertex clustering is certainly not, and will thus be a primary focus here. The mesh is compressed as indicated in FIG. 1D. For each manifold connected component, the mesh connectivity is encoded, followed with optional stitches, and mesh geometry and properties. Stitches are used to recover the vertex clustering within the current component and between vertices of the current component and previous components. In this way, for each cluster, mesh geometry and properties are only encoded and decoded for the vertex of the cluster that is encountered first (in decoder order of traversal).

The vertex clustering is decomposed in a series of variable length stitches, that merge a given number of vertices along two directed paths of vertices. A bit-stream syntax is capable of supporting either one of a simple and fast decomposition technique or a more advanced decomposition technique, and it is not required that the encoder use the more advanced technique.

The teachings of the instant invention improve upon the technique of Popovic and Hoppe by achieving significantly smaller bit-rates (about 10 bits per vertex or so) and reducing encoding time by more than four orders of magnitude (without levels-of-detail).

A first discussion will treat the cutting of a non-manifold mesh to produce manifold meshes. A presently preferred technique is one given by André Guéziec et al., "Converting sets of polygons to manifold surfaces by cutting and stitching", in Visualization '98, pages 383–390, October 1998, IEEE. In this technique, and for each edge of the polygonal mesh, it is determined whether the edge is singular (has three or more incident faces) or is regular. Edges for which incident faces are inconsistently oriented are also considered to be singular for the purpose of this process. For each singular vertex of the polygonal mesh, the number of connected fans of polygons incident to it is determined. For each connected fan of triangles, a copy of the singular vertex is created (thereby duplicating singular vertices). The resulting mesh is a manifold mesh. The correspondences between the new set of vertices comprising the new vertex copies and the old set of vertices comprising the new vertex copies and the old set of vertices comprising the singular vertices is recorded in vertex clustering array. This process is illustrated in FIG. 1.

This method admits a number of variations that moderately alter the original mesh connectivity (without recovering it after decoding) in order to achieve a decreased size of the bit-stream: polygonal faces with repeated indices may be removed. Repeated faces (albeit with potentially different properties attached) may also be removed. Finally, the number of singular edges may be reduced by first attempting to invert the orientation of some faces in order to reduce the number of edges whose two incident faces are inconsistently oriented.

With regard to compressing manifold meshes, the method described below extends the Topological Surgery method of G. Taubin et al. referred to above, and is explained in detail in ISO/IEC 14496-2 MPEG-4 Visual Committee Working Draft Version, SC29/WG11 document number W2688, Seoul, Apr. 2, 1999. In G. Taubin et al. the connectivity of the mesh is presented by a tree spanning the set of vertices, a simple polygon, and optionally a set of jump edges. To derive these data structures a vertex spanning tree is first constructed in the graph of the mesh and the mesh is cut through the edges of the tree. If the mesh has a simple topology, the result is a simple polygon. However if the mesh has boundaries or a higher genus, additional cuts along jump edges are needed to obtain the simple polygon. This simple polygon is then represented by a triangle spanning tree and a marching pattern that indicates how neighboring triangles are connected to each other. The connectivity is then encoded as a vertex tree, a simple polygon and jump edges.

In accordance with the teachings of this invention the technique is modified. First, a triangle spanning tree is constructed. Then the set of all edges that are not cut by the triangle tree are gathered into a graph. This graph, called a Vertex Graph, spans the set of vertices, and may have cycles. Cycles are caused by boundaries or handles (for higher genus models). The vertex graph, triangle tree, and marching pattern are sufficient to represent the connectivity of the mesh.

In the technique of G. Taubin et al. the geometry and properties are coded differentially with respect to a prediction. This prediction is obtained by a linear combination of ancestors in the vertex tree. The weighing coefficients are chosen to globally minimize the residues, i.e. the difference between the prediction and the actual values.

In accordance with the teachings of this invention the principle of linear combination is preserved, but the triangle tree is used instead of the vertex tree for determining the ancestors. Note that the "parallelogram prediction" of above-referenced C. Touma and C. Gotsman ("Triangle mesh compression", Proceedings Graphics Interface, pages 26–34, 1998), may be considered to be a special case of this scheme, and is achieved through the appropriate selection of the weighing coefficients. Coding efficiency is further improved by the use of an efficient adaptive arithmetic coder, such as one described by M. J. Slattery and J. L. Mitchell, "The qx-coder", IBM J. Res. and Dev. 42(6) :767–784, 1998, which is incorporated by reference herein in its entirety. Arithmetic coding is applied to all data, namely mesh connectivity, geometry and properties.

Finally, the data is ordered such as to permit efficient decoding and on-the-fly rendering. The vertex graph and triangle tree are first placed into the bit stream. The remaining data, i.e. marching pattern, geometry, and properties, is referred to as triangle data and is next placed into the bit stream. It is organized on a per-triangle basis, following a depth-first traversal of the triangle tree. In this way a new triangle may be rendered every time a few more bits, corresponding to the data attached to the triangle, are received.

Described now is a presently preferred technique for representing the vertex clustering using stitches. Two methods are introduced, referred to herein as a Stack-Based method and a Variable-Length method. The decomposition of the vertex clustering in stitches relies on the availability of two main elements: (1) a decoding order for the mesh vertices, and (2), for the variable-length method only, an unequivocal means of defining paths of vertices.

Assume that such paths are recorded in an array called v_father, representing a function $\{1, \ldots, n\}$ V-father$\{1, \ldots, n\}$v, where n is the number of vertices.

It is noted that all of the manifold mesh compression methods reviewed above can provide a decoding order of the vertices, as well as unambiguous paths of vertices from the decoded connectivity (the decoding order being one example). FIG. 2 shows v_father for the example of FIG. 1, obtained using the Topological Surgery method. In the following it is assumed, without loss of generality, that vertices are enumerated in the decoder order of traversal. If this is not the case, one can perform a permutation of the vertices. Both the stack-based and variable-length methods take as input a vertex clustering array, which for convenience is denoted by v_cluster ($\{1, \ldots, n\}$ V-father$\{1, \ldots, n\}$).

To access vertices through v_cluster, assume the convention that v_cluster always indicates the vertex with the lowest decoder order. For example, suppose that vertices 1 and 256 belong to different components but cluster to the same vertex. In this case it is better to write v_cluster[1]= v_cluster[256]=1, than to write v_cluster[1]=v_cluster[256]=256. As the encoder (and decoder) build components gradually, at some point Vertex 1 will be a "physical" vertex of an existing component, while Vertex 256 will be in a yet-to-be-encoded component. Accessing Vertex 1 through Vertex 256 would thus increase code complexity.

A description will now be given of the stack-based method that was briefly referred to above. This method employs a stack-buffer for stitches, similarly to M. Deering ("Geometry compression", Siggraph '95 Conference Proceedings, pages 13–20, Los Angeles, August 1995), and other manifold mesh compression modules (see ISO/IEC 14496-2 MPEG-4 Visual Committee Working Draft Version, SC29/WG11 document number W2688, Seoul, Apr. 2, 1999.) In the decoding order the method pushes, gets and pops in a stack-buffer the vertices that cluster together. Connected components can be computed for the vertex clustering, such that two vertices belong to the same component if they cluster to the same vertex. One can thus associate a stitching command for each vertex that belongs to a component whose size is larger than one. The command is either PUSH, or GET, or POP, depending on the decoding order of the vertices in a given component. The vertex that is decoded first is associated with a PUSH, while all subsequently decoded vertices are associated with a GET except the vertex decoded last, which is associated with a POP. For the example of FIG. 1, the association of commands to vertices is illustrated in FIG. 3.

A description is now given of the variable-length method. One aspect of the stack-based method is that it requires one to send one stitching command (either PUSH, GET or POP) for each vertex that clusters to a singular vertex. Instead, by specifying an integer length one may keep stitching vertex pairs when following the v_father relationship, as is illustrated in FIG. 4. As mentioned before, the information consigned in v_father is implicit; it is supplied by the decoder without requiring a specific encoding.

Using the same example of FIG. 1, it is illustrated in FIGS. 5A–5D how variable length stitches can be used to represent the vertex clustering. A stitch of length 1 greater than zero is performed by starting with two vertices and stitching vertices along the two paths starting at the vertices and defined using the v_father graph, exactly l+1 times. For the example of FIGS. 5A–5D, three stitches are applied to represent v_cluster; one (forward) stitch of length 1, one stitch of length zero, and one stitch of length 2 in the reverse direction. A stitch in the reverse direction works similarly by starting with two vertices, following the path for the second vertex and storing all vertices along the path in a temporary structure, and stitching vertices along the first path together with the stored vertices visited in reverse order.

An explanation is now given as to how to discover such stitches from the knowledge of the v_cluster and v_father arrays.

While the ultimate goal is to minimize the total encoding size for stitches (with manageable encoder and especially, decoder, complexities), a good working hypothesis (heuristic) states that: the longer the stitches, the fewer the commands, and the smaller the bit-stream size. A "greedy" method is proposed that operates as follows. The method first computes for each vertex that clusters to a singular vertex the longest possible forward stitch starting at that vertex; a length and one or several candidate vertices to be stitched with are then determined. As illustrated in FIG. 6A, starting with a vertex vo, $v_0$, $v_0 \in \{1, \ldots, n\}$, all other vertices in the same cluster are identified, and v_father is followed for all these vertices. From the vertices thus obtained, the method retains only those belonging to the same cluster as v_father[$v_0$]. This process is iterated until the cluster contains a single vertex. The ancestors of vertices remaining in the previous iteration ($v_f$ is the successor of $v_0$ ending the stitch in FIG. 6A) are candidates for stitching ($v_1$ in FIG. 6A). Special care must be taken with self-loops in v_father in order for the process to finish and the stitch length to be meaningful. Also, in the preferred implementation it has been assumed that v_father did not have loops (except self-loops). In the event v_father does have loops one should take care to ensure that the process finishes.

Starting with $v_f$, the method then attempts to find a reverse stitch that would potentially be longer. This is illustrated in FIG. 6B, by examining vertices that cluster with v_father [$v_f$], such as $v_2$. The stitch can be extended in this way several times. However, since nothing prevents a vertex v and its v_father[v] from belonging to the same cluster, one should avoid stitching $v_0$ with itself.

All potential stitches are inserted in a priority queue, indexed with the length of the stitch. The method then empties the priority queue and applies the stitches in order of decreasing length until the vertex clustering is completely represented by stitches. This simple strategy can be extended to cope with the following several issues.

Issue (1): The representation method should respect and use the decoder order of connected components of the manifold mesh. As was mentioned above, independently of the number of vertices that cluster to a given vertex, the geometry and properties for that vertex are encoded only once, specifically for the first vertex of the cluster that is decoded. Connectivity, stitches, geometry and properties are encoded and decoded on a component-per-component basis (see FIG. 1C). This implies that after decoding stitches corresponding to a given component, say Component m, the complete clustering information (relevant portion of v_cluster) for Component m as well as between Component m and the previously decoded components 1, . . . , m−1 should be available. If this is not so, there is a mismatch between the geometry and properties that were encoded (too few) and those that the decoder is trying to decode, with potentially adverse consequences.

The stack-based method generates one command per vertex, for each cluster that is not trivial (cardinal larger than one), and no problem arises with regard to this requirement. However, when applying the variable-length search for longest stitches on all components together, the optimum found by the method could be as in FIG. 7A, where three components may be stitched together with two stitches, one involving Components 1 and 3 and the second involving Components 2 and 3.

Assuming that the total number of manifold components is c, a preferred solution is to iterate on m, the component number in decoder order, and for m between 2 and c, perform a search for longest stitches on components 1, 2, . . . ,m.

Issue (2): The longest stitch cannot always be performed, because of incompatibilities with the decoder order of vertices; a vertex can only be stitched to one other vertex of lower decoder order. The example in FIG. 7B illustrates this, wherein the (12,3) stitch should be substituted with (7,3) which is an equally long stitch, and therefore listed in the priority queue. Since problems only involve vertices that start the stitch, it is possible to split the stitch in two stitches, one being one unit shorter and the other being of length zero. Both stitches are entered in the priority queue.

For stitches of length zero, the incompatibility with the decoder order of vertices can always be resolved. In FIG. 7B, and for stitching three vertices, one can consider three stitching pairs, only one of which is rejected. Since for stitches of length zero the direction of the stitch does not matter, all other stitching pairs are valid.

Issue (3): The method generates the longest stitch starting at each vertex. It is possible that this may not provide enough stitches to encode all of the vertex clusters. In this case the method may finish encoding the clusters using zero-length stitches in a manner similar to the stack-based method.

Once a working combination of stitches is found, the last step is to translate them to stitching commands. This is described below, and a bit-stream syntax is specified as well.

To encode the stitching commands in a bit-stream, the following syntax is proposed (that accommodates commands generated by both the stack-based and variable-length methods.) To specify whether there are any stitches at all in a given component, a boolean flag has_stitches is used. In addition to the PUSH, GET and POP commands, a vertex may be associated with a NONE command, in case it is sole representative of its cluster (e.g. it does not correspond to a singular vertex in the non-manifold mesh), or in case the information on how to cluster it was already taken care of (variable-length method only). In general, because a majority of vertices are expected to be non-singular, most of the commands should be of type NONE. Three bits referred to as stitching_command, pop_or_get, and pop are used for coding the commands NONE, PUSH, GET and POP, as is shown in FIG. 8.

A stitch_length unsigned integer is associated with a PUSH command. A stack_index unsigned integer is associated with GET and POP commands. In addition, GET and POP have the following parameters; differential_length is a signed integer representing a potential increment or decrement with respect to the length that was recorded with a previous PUSH command, or updated with a previous GET and POP (using differential_length); push_bit is a bit indicating whether the current vertex should be pushed in the stack; and reverse_bit indicates whether the stitch should be performed in a reverse fashion.

It is now explained how to encode (translate) the stitches obtained in the previous section in compliance with the defined syntax. Both the encoder and the decoder maintain an anchor_stack across a manifold connected component for referring to vertices (potentially belonging to previous components). For the stack-based method, the process is straightforward; in addition to the commands NONE, PUSH, GET and POP encoded using the three bits stitching_command, pop_or_get, and pop, a PUSH is associated with stitch_length=0. GET and POP are associated with a stack_index that is easily computed from the anchor_stack.

For the variable-length method, the process can be better understood by examining FIG. 9. In FIG. 9A there is shown a pictorial representation of a stitch. A vertex is shown with an attached string of edges representing a stitch length, and a stitch_to arrow pointing to an anchor. Both vertex and anchor are represented in relation to the decoder order of vertices.

The stitch_to relationship defines a partition of the vertices as associated with stitching commands. In FIG. 9B a component of this partition is isolated. For each such component, the method visits the vertices in decoder order (e.g., $v_0$, $v_1$, $v_2$, $v_3$, in FIG. 9B.) For the first vertex, the command is a PUSH. Subsequent vertices are associated with a GET or POP depending on remaining stitch_to relationships; for vertices that are also anchors, a push_bit is set. Incremental lengths and reverse_bits are also computed. FIG. 9C shows the commands associated with FIG. 9B. For the example of FIG. 1 that we have used throughout this paper, the final five commands different from NONE are gathered in Table 1 (FIG. 13).

After the commands are in this form, the encoder operates in a manner completely symmetric to the decoder (which is described in detail in the next section), except that the encoder does not actually perform the stitches while the decoder does.

A description is now made of stitch decoding. The stitch decoder reconstructs the v_cluster that should be applied to vertices to reconstruct the polygonal mesh. The pseudo-code shown below summarizes the operation of the stitch coder. As can be seen, if the boolean has_stitches in the current connected component is true, then for each vertex of the current component, in decoder order, a stitching command is decoded. If the boolean value stitching_command is true, then the boolean value pop_or_get is decoded; while if the boolean value pop_or_get is false, an unsigned integer is decoded, and associated to the current vertex i as an anchor (to stitch to). The current vertex i is then pushed to the back of the anchor_stack, if pop_or_get is true, then the boolean value pop is decoded, followed with the unsigned integer value stack_index.

```
decode_stitches_for_a_connected_component(anchor_stack) {
  if(has_stitches == true)
    for(i=nV0;i<V1;i++)(//nV0 is the first vertex
    // of the current component, and nV1-1 is the last
       vertex
    decode stitching command;
    if(stitching_command) {
       decode pop_or_get;
       if (pop_or_get) {
          decode pop;
          decode stack_index;
          retrieve anchor from anchor_stack;
          if (pop) {
             remove stitching_anchor from anchor_stack;
          } // end if
          decode incremental_length;
          if (incremental length !=0) {
             decode incremental_length_sign;
          } // end if
          decode push_bit;
          if (push_bit)
             push i to the back of anchor_stack
          retrieve stitch_length at anchor;
          total_length = stitch_length +
                incremental_length;
          if (total_length > 0)
             decode reverse_bit;
          stitch i to anchor for length of total_length and
                reverse if (reverse_bit);
       } //end if (pop_or_get)
       decode stitch_length;
       push i to the back of anchor_stack;
       save stitch_length at anchor i;
    } // end if (stitching_command)
  } // end for
}
```

Using the stack_index, an anchor is retrieved from the anchor_stack. This is the anchor that the current vertex i will be stitched to. If the pop boolean variable is true, then the anchor is removed form the anchor_stack. Then, an integer differential_length is decoded as an unsigned integer. If it is different from zero, its sign (boolean differential_length_sign) is decoded, and is used to update the sign of differential_length. A push_bit boolean value is decoded. If push-bit is true, the current vertex is pushed to the back of the anchor_stack. An integer stitch_length associated with the anchor is retrieved. A total_length is computed by adding stitch length and differential_length; and if total_length is greater than zero, a reverse_bit boolean value is decoded. Next the v-cluster array is updated by stitching the current vertex i to the stitching anchor with a length equal to total_length, potentially using a reverse stitch. The decoder uses the v_father array to perform this Operation. To stitch the current vertex i to the stitching anchor with a length equal to total_length, starting from both i and the anchor at the same time, the method follows vertex paths starting with both i and the anchor by looking up the v_father entries total_length times, and for each corresponding entries (i, anchor), (v_father[i], v_father[anchor]), (v_father[v_father[i]], v_father[v_father[anchor]]) . . . , and recording in the v_cluster array that the entry with the largest decoder order should be the same as the entry with the lowest decoder order. For instance, if (j>k), then v_cluster[j]=k. v_cluster defines a graph that is a forest. Each time an entry in v_cluster is changed, the method performs path compression on the forest by updating v_cluster such that each element refers directly to the root of the forest tree it belongs to.

If the stitch is a reverse stitch, then the method first follows the v_father entries starting from the anchor for a length equal to the total_length (from Vertices 6 through 3 in FIGS. 5A–5D), recording the intermediate vertices in a temporary array. The method then follows the v_father entries starting from the vertex i, and for each corresponding entry stored in the temporary array (from the last entry to the first entry), updates v_cluster as explained above.

Figure 11:
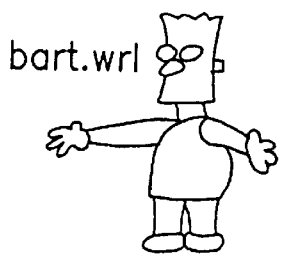
FIG. 11 depicts various test meshes to which the teachings of this invention can be applied.
Figure 11:
Figure 11:
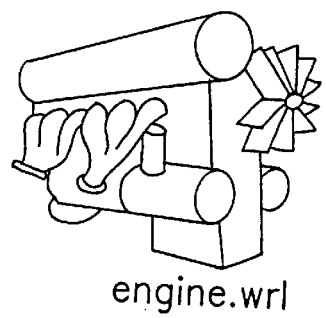
Figure 11:
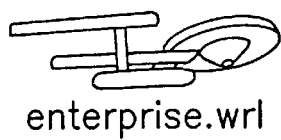
Figure 11:
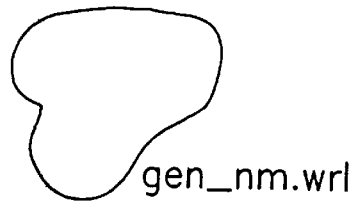
Figure 11:
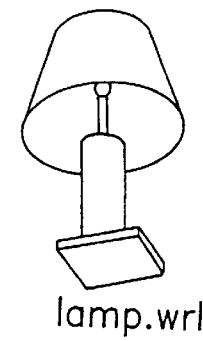
Figure 11:
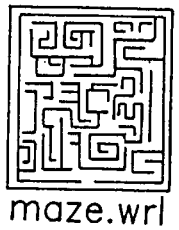
Figure 11:
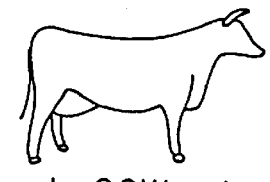
Figure 11:
Figure 11:
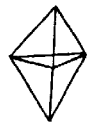
Figure 11:
Figure 11:
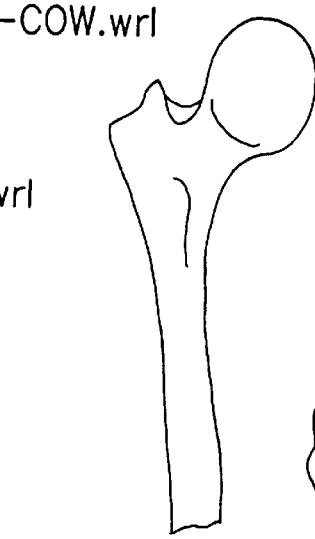
Figure 11:
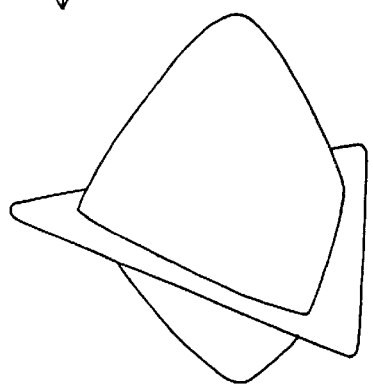
Figure 11:
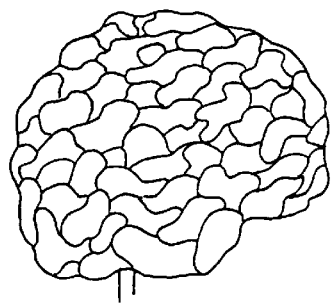

A discussion of experimental results is now given for several test meshes. All of the meshes illustrated in FIG. 11 were considered, ranging from having a few vertices (5) to about 65,000. The meshes range from having very few non-manifold vertices (2 out of 5056 or 0.04%) to a significant proportion of non-manifold vertices (up to 88% for the Sierpinski.wrl model). One mesh was manifold and all the rest of the meshes were non-manifold. The manifold mesh will be easily identified in Table 2, which is shown in FIG. 14. One model (Gen_nm.wrl) had colors and normals per vertex.

Test Conditions: The following quantization parameters were used: geometry (vertex coordinates) was quantized to 10 bits per coordinate, colors to 6 bits per color, and normals to 10 bits per normal. The coordinate prediction was done using the "parallelogram prediction" of C. Touma and C.

Gotsman ("Triangle mesh compression", Proceedings of Graphics Interface, pages 26–34, 1998), the color prediction was done along the triangle tree, and there was no normal prediction. Using 10 bits per coordinate, there was hardly a noticeable difference between the original and decoded models. For completeness, FIG. 12 illustrates a more complex test model both before compression (12A) and after decompression (12B).

This disclosure has thus far focused on encoding and decoding stitches, which is a small portion of the geometry compression process. It will now be shown how to determine how stitches affect the entire compression process, and estimates will be provided of compression ratios and decoding timings applying to the entire process. The following estimates (obtained using the 14 meshes shown in FIG. 11) may be revised as more statistical data becomes available, or as more efficient encoders and decoders are implemented.

Table 2 of FIG. 14 shows compressed bit-stream sizes for the 14 meshes and compares the bit-stream sizes when meshes are encoded as non-manifolds or as manifolds (i.e., without the stitching information). There is an initial cost for each mesh on the order of about 40 bytes, independently of triangles and vertices. Although specific results are not provided on the connectivity encoding, it can be expected that the connectivity will generally consume significantly fewer bits than coordinates and properties, once compressed and arithmetic-coded (a few bits per triangle at most; e.g., from 0.1 bits to 3 bits per triangle).

In the case of smooth meshes, the connectivity coding, prediction and arithmetic coding appear to divide by three or so the size of quantized vertices. For example, and starting with 10 bits per vertex of quantization, a typical bit-stream size would be on the order of 10 bits per vertex and 5 bits per triangle (assuming a manifold mesh without too many boundaries). In case of highly non-manifold or non-smooth meshes, starting with 10 bits per vertex of quantization, a typical bit-stream size would be on the order of 20 bits per vertex and 10 bits per triangle (smooth meshes compress roughly twice as much).

The previous estimates apply to both manifold and non-manifold compression. Table 2 of FIG. 14 indicates that when compressing a non-manifold as a non-manifold (i.e., recovering the connectivity using stitches) the total bit-stream size can be reduced by up to 20% (e.g., 21% for the tetra2nm.wrl model). This is because when encoding stitches, vertices that are stitched together are encoded only once (such vertices were duplicated during the non-manifold to manifold conversion process). The same applies to per-vertex properties.

Table 3 shown in FIG. 15 compares the efficiencies of the stack-based encoder and variable-length encoder by measuring total bit-stream sizes. The observed bit-stream sizes decrease using the variable-length encoder, in three cases by up to 5%. Typically, 5% of the total bit-stream size represents a significant proportion of the connectivity (perhaps all of it), while the stitches should represent a small portion of the connectivity (which includes vertex graph, triangle trees, etc.) Thus the savings of the variable-length encoder are very significant, and these bits could be better used for a more accurate encoding of the geometry.

Table 4 shown in FIG. 16 depicts overall encoding and decoding timings. A decoding speed of 10,000 to 13,000 vertices per second was observed on a commonly available 233 MHz Pentium™-based laptop computer (Pentium is a registered trademark of Intel Corporation). These timings apply to most meshes, including meshes with one or several properties (such as gen_nm.wrl), with the exception of meshes with fewer than 50 vertices or so, which would not be significant for measuring per-triangle or per-vertex decompression speeds (because of various overheads). While these results appear to be at first an order of magnitude slower than those reported by S. Gumhold and W. Strasser, "Real time compression of triangle mesh connectivity", in Siggraph'98 Conference Proceedings, pages 133–140, Orlando, July 1998, referenced above, it should be noted that these authors decoded the connectivity only (which is only one functionality, and a small portion of compressed data) and observe their timings on a different computer.

The inventors have thus far described a method for compressing non-manifold polygonal meshes that combines a known method for compressing a manifold mesh and novel methods for encoding and decoding stitches. These latter methods comply with the bit-stream syntax for stitches that was defined above.

The foregoing results show that non-manifold compression has no noticeable effect on decoding complexity. Furthermore, compared with encoding a non-manifold as a manifold, the method of this invention permits savings in the compressed bit-stream size (of up to 20%, and in average of 8.25%), because it avoids duplication of vertex coordinates and properties. This is in addition to achieving the functionality of compressing a non-manifold without perturbing the connectivity.

In terms of encoding, the inventors have presented two different encoders; a simple entry-level encoder, and a more complex encoder that uses the full potential of the syntax. The results reported above indicate that the additional complexity of the second encoder is justified in several cases. However, other encoders may be designed in compliance with the above-described syntax, and the teachings of this invention should not be construed as being limited to only the encoder embodiments described above.

The use of the stitches described above allows more than connectivity-preserving non-manifold compression: it also enables merging components and performing all other topological transformations corresponding to a vertex clustering.

It should be further noted that the decoder described above was not optimized. However, the decoder may be optimized in at least the following ways (other optimizations are possible as well): (1) limiting modularity and function calls between modules, once the functionalities and syntax are frozen; (2) optimizing the arithmetic coding, which can be a bottleneck of the decoding process (every single cycle in the arithmetic coder is of concern); and (3) performing a detailed analysis of memory requirements, imposing restrictions on the size of mesh connected components, and limiting the number of cache misses in this way.

By way of a summary of the disclosure thus far, and expressed in a different way, each stitch is described by a first and a second vertex (called the anchor) to which the first vertex is stitched, a length, and a direction (forward or reverse). The first and second vertices define a path of vertex indices having a length of Length+1, with the first vertex index as first element of the first path, the second vertex index as first element of the second path, and subsequent indices determined by the v_father array, so that if k is the j-th element of a path, v_father[k] is the (j+1)-th element of the path. Vertex indices may be repeated in the path.

The paths establish a correspondence among vertex indices located at the same position along the paths. For the case of a reverse stitch, the second path is traversed from the last position to the first position. The transitive closure of the set of these correspondences defined by all the stitches defines an equivalence relation. Equivalently, the set of stitches defines a (maximal) partition of the vertices of the mesh into disjoint sets, so that if a stitch establishes a correspondence between vertices i and j, then vertices i and j belong to the same disjoint set of the partition. The stitched mesh has exactly as many vertices as disjoint sets in the partition.

It is important to note that since stitches of length zero are allowed, any non-manifold mesh can clearly be represented in this way, because any non-manifold mesh can be represented as a manifold mesh with one or more sets of vertices identified (common). A detailed discussion of non-manifold polygonal meshes and algorithms for obtaining a manifold mesh from a non-manifold mesh by cutting through all the singular vertices and edges is provided in U.S. patent application Ser. No. 08/840,001, entitled "Method To Convert Non-Manifold Polyhedral Surfaces Into Manifold Surfaces", and previously incorporated by reference herein in its entirety.

Figure 17:
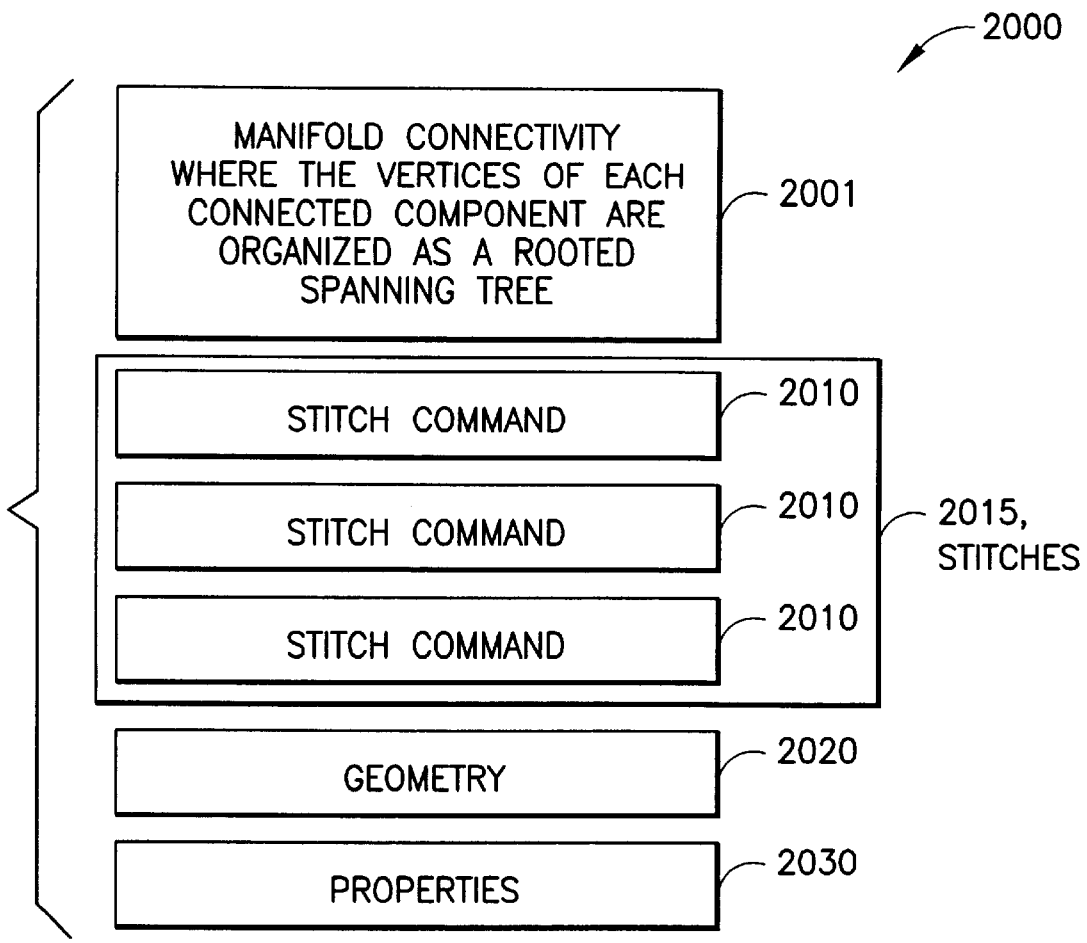
FIG. 17 is a block diagram of a data structure representing a non-manifold surface.

Reference is also made to FIG. 17, which illustrates a data structure 2000 that represents a non-manifold surface in accordance with the teachings of this invention. The data structure 2000 contains a manifold connectivity portion 2001, a stitch command portion 2010, a geometry portion 2020, and a properties portion 2030.

The stitches are encoded as a sequence of vertex_stitch records, with each vertex_stitch record corresponding to one vertex of the manifold mesh. The order of the vertex_stitch records in the sequence is determined by the order of traversal of the vertex forest of the manifold mesh. The stitches are encoded with an associated stitch stack, which is initially empty. The corresponding vertex_stitch record includes a vertex_stitch_type field and optional associated data. If the vertex index has no corresponding stitching command, the corresponding vertex_stitch_type value is NONE.

If the vertex corresponds to an anchor (second vertex) of a stitch and is not otherwise stitched with another anchor, the corresponding vertex_stitch_type value is PUSH, and the vertex index is pushed onto the stitch stack, along with the length of the stitch, which is encoded as associated data.

If the vertex is the last to be stitched to an anchor, the corresponding vertex_stitch_type value is POP, and the vertex index of the anchor, stored in the stitch stack in the position determined by the stack index encoded as associated data, is removed from the stitch stack. This produces a re-enumeration of subsequent stitch stack entries. In addition, the differential length of the stitch is encoded, and the differential length is added to or subtracted from the length stored for the anchor. A push bit is also encoded. The push bit is set to be true if the vertex index is an anchor for other stitches. Otherwise, the push bit is set to be false. Finally, a reverse bit is encoded if and only if the length of the stitch is larger than zero (if the differential length, when added to the length stored at the anchor, exceeds zero).

If the vertex is stitched to an anchor, and other vertices are subsequently stitched to the same anchor, the corresponding vertex_stitch_type value is GET, and the vertex index of the anchor stored in the stitch stack in the position determined by the stack index encoded as associated data is retrieved but not removed from the stitch stack, because subsequent stitches refer to it. As with the POP case, the differential length of the stitch is encoded, and the differential length is added to or subtracted from the length stored for the anchor.

Figure 19A:
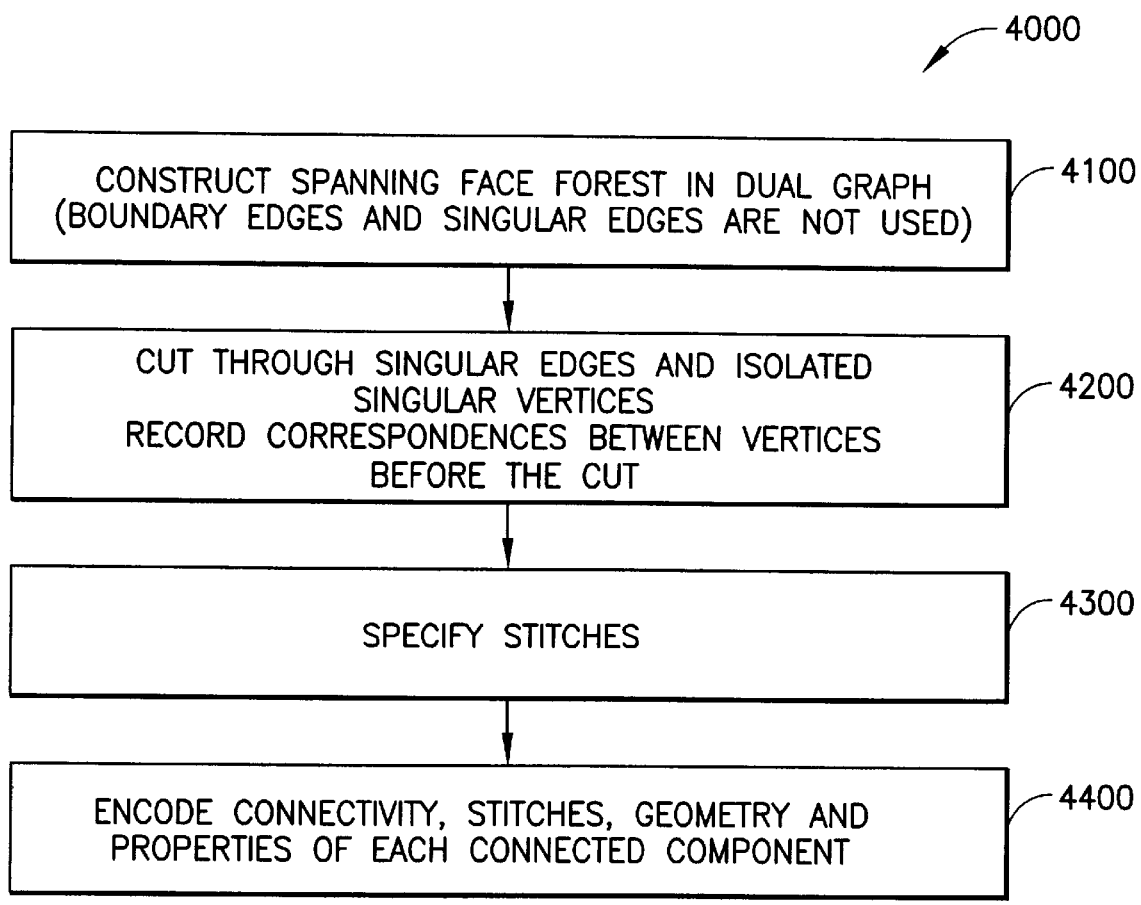
FIG. 19A is a flow chart of a compression process.
Figure 19B:
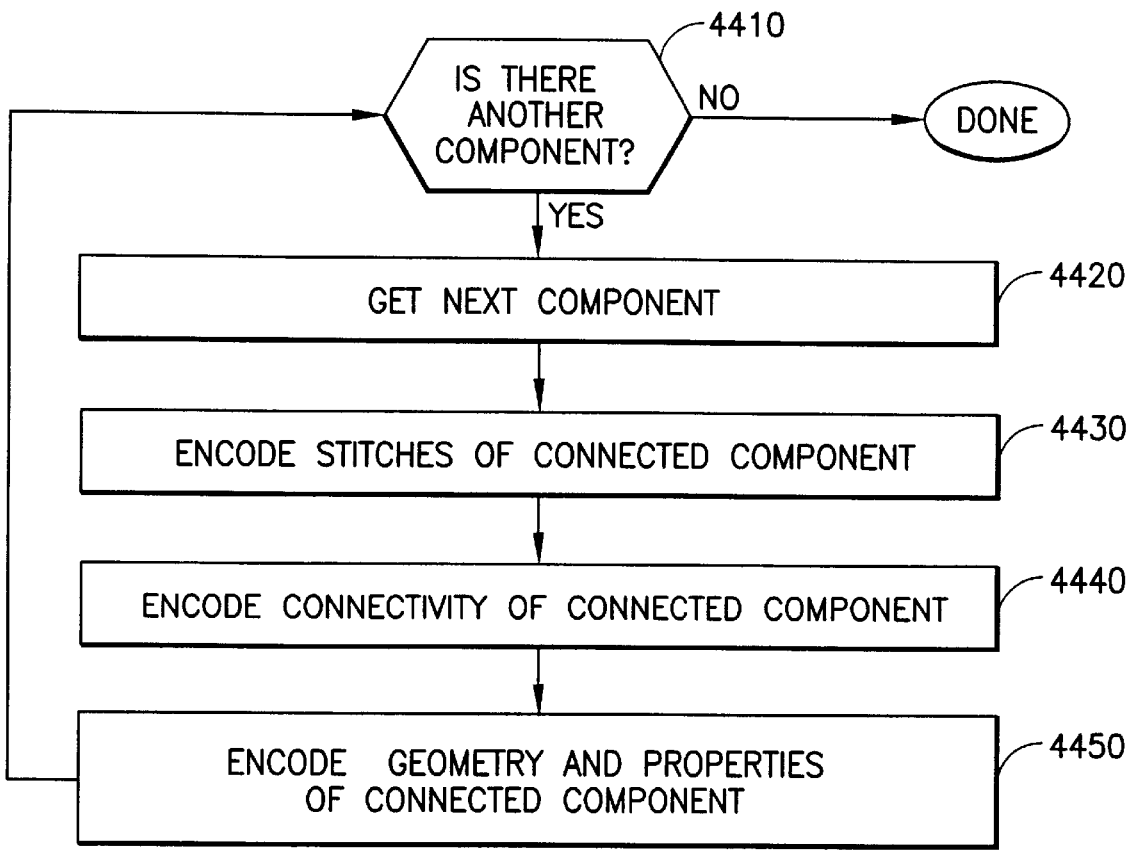
FIG. 19B is a further flow chart of the compression process, wherein steps 4410–4450 show the operation of the step 4400 of FIG. 19A in greater detail.

As is shown in FIG. 21, the preferred variable length codes vertex_stitch_type are as follows:

1. 0 for a NONE
2. 10 for a PUSH
3. 110 for a GET
4. 111 for a POP The encoding of a non-manifold 3D model comprises the following steps. Reference is also made to the flow charts of FIGS. 19A and 19B.

A. Represent the non-manifold polygonal mesh as a manifold polygonal mesh and a vertex clustering map obtained by cutting through singular edges and vertices. The faces of the two polygonal meshes are in one-to-one correspondence, and the clustering map assigns each vertex of the manifold polygonal model to its corresponding vertex in the non-manifold polygonal model before the cutting process. The clustering map is represented as an array v_cluster with as many elements as vertices in the manifold polygonal model.

B. Represent each connected component of the manifold polygonal model, as described in the above-referenced ISO/IEC 14496-2 MPEG-4 Visual Committee Working Draft Version, SC29/WG11 document number W2688, Seoul, Apr. 2, 1999, with a vertex graph, a triangle tree, and a triangle data record. The order of the connected components and the order of a traversal of the vertex trees spanning the vertex graph determine a global order of traversal, represented as a v_traversal array. The parent-child relationships are represented as a v_father array (see also the data structure 3000 of FIG. 18).

C. Run an algorithm to discover stitches (step 4300), i.e., to represent the information contained in the v_cluster array as a set of stitching commands of the type NONE, PUSH, GET or POP with associated data as explained above (see also the stitching command data structure shown in FIG. 21.) The v_traversal array represents a permutation of the vertices, which is used to convert encoder vertex indices to decoder vertex indices.

D. Apply stitches to a look-up table describing the relation between simple polygon boundary loop nodes (see again the above-referenced ISO/IEC 14496-2 MPEG-4 Visual Committee Working Draft Version, SC29/WG11 document number W2688, Seoul, Apr. 2, 1999) and mesh vertices. This information is used later to keep track of visited vertices in the triangle data record.

E. At step 4400, encode the discovered stitches in the bit-stream according to the syntax described above. The flow chart of FIG. 19B (steps 4410–4450) show the operation of the step 4400 in greater detail.

Figure 20:
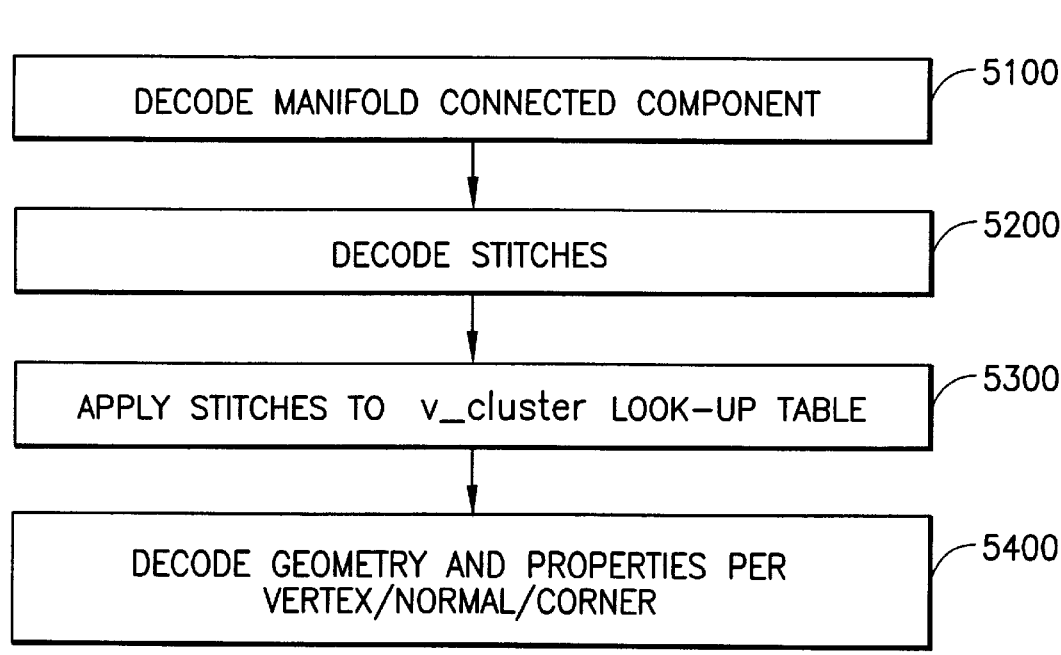
FIG. 20 is a flow chart of a decompression process.

Reference is now made to the flow chart 5000 of FIG. 20 for illustrating a presently preferred decoding process. The decoding of a non-manifold 3D model comprises the following steps.

A. At step 5100, decode manifold connected components preferably using the Rossignac et al. method or using other suitable methods.

B. Decode stitches (step 5200).

C. At step 5300, apply stitches to the v-cluster look-up table describing the relation between simple polygon boundary loop nodes and mesh vertices. This information is used later to keep track of visited vertices when decoding vertex and triangle geometry and properties.

D. At step 5400, decode the geometry and properties per vertex/normal/corner.

Figure 10:
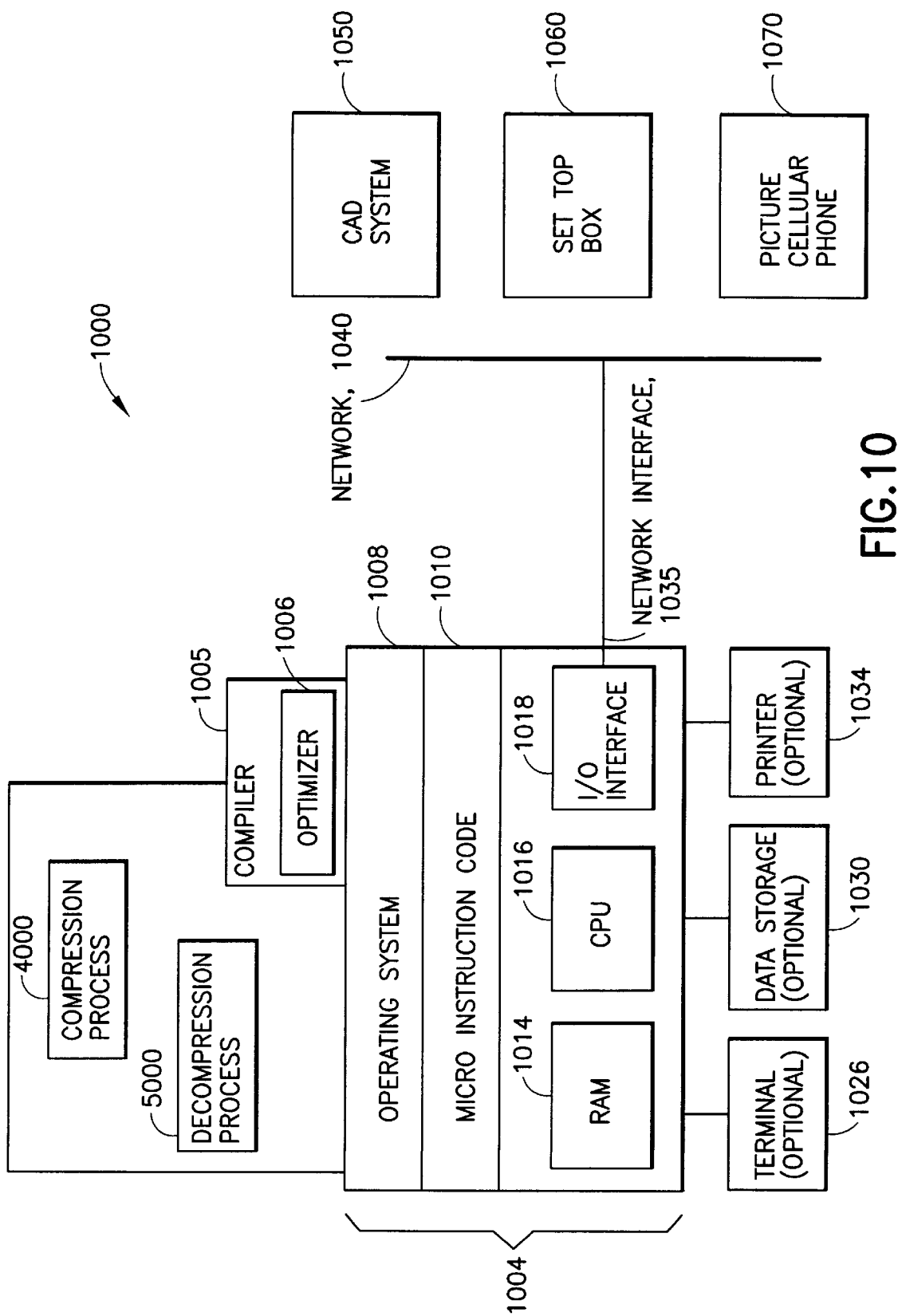
FIG. 10 is an overall simplified block diagram of a data processing system that is suitable for practicing this invention.

FIG. 10 is a block diagram showing an exemplary computer system 1000 on which preferred embodiments of the methods of this invention operate. The preferred embodiment includes one or more application programs. One type of application program is a compiler 1005 which may include an optimizer 1006. The compiler 1005 and optimizer 1006 are configured to transform a source program (such as other application programs) into optimized executable code. More generally, the source program is transformed to an optimized form and then into executable code. The compiler 1005 and optimizer 1006 operate on a computer platform or hardware unit 1004. Some other application programs that run on the system 1000 include, in accordance with this invention, the compression process 4000 (FIGS. 19A, 19B) and the decompression process 5000 (FIG. 20), each of which has been described in detail above.

The hardware unit 1004 includes one or more central processing units (CPU) 1016, a random access memory (RAM) 1014, and an input/output (I/O) interface 1018. Micro-instruction code 1010, for instance a reduced instruction set, may also be included on the platform 1004. Various optional peripheral components may be connected to the computer platform, including a graphical interface or terminal and user interface 1026, a data storage device 1030, and a printing device 1034. An operating system 1008 coordinates the operation of the various components of the computer system 1000.

An example of computer system 1000 is the IBM RISC System/6000 (RISC System/6000 is a trademark of the International Business Machines Corporation.) It is readily understood that those skilled in the computer arts will be familiar with many equivalent computer systems 1000, and the teachings of this invention are not intended to be limited for use with any one particular type of computer or computer architecture.

Connected to the I/O interface 1018 is a network interface 1035 and a network 1040. The network 1040 could be a local area network (LAN) or a wide area network (WAN). The network 1040 could be a private network or a public network, and may comprise the Internet. Connected to the network 1040 are devices to which one may wish to transfer a compressed non-manifold model, or from which one may wish to receive a compressed non-manifold model and to then decompress the model. These devices could be, but are certainly not limited to, a CAD system 1050, a television set top box 1060, and/or a communications device 1070 having a graphical display capability.

The data structures representing a non-manifold mesh in the present invention can be further understood by examining FIG. 17. Referring to FIG. 17, a non-manifold mesh contains manifold connectivity 2001, stitches 2015, geometry 2020 and properties 2030. Stitches 2015 are comprised of zero or a plurality of individual stitching commands 2010.

Figure 18:
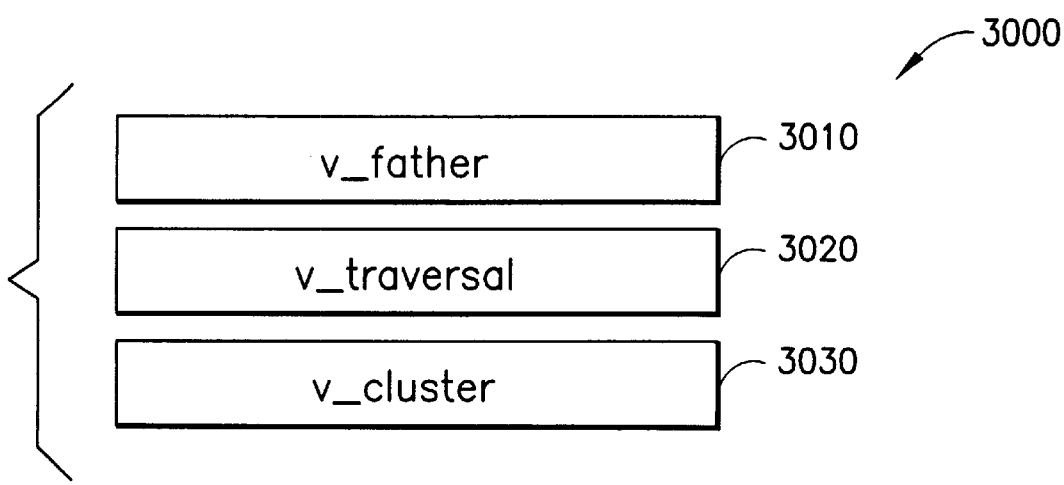
FIG. 18 is a block diagram of data structures used in the compression and decompression process.

The data structures used in the compression process 4000 and the decompression process 5000 can be further understood by examining FIG. 18. The data structures contain the v_father array (or list) 3010, the v_traversal array (or list) 3020, and the v_cluster array (or list) 3030. These various arrays or lists could be stored in the RAM 1014 of FIG. 10, and/or on the optional data storage device 1030.

Figure 1B:
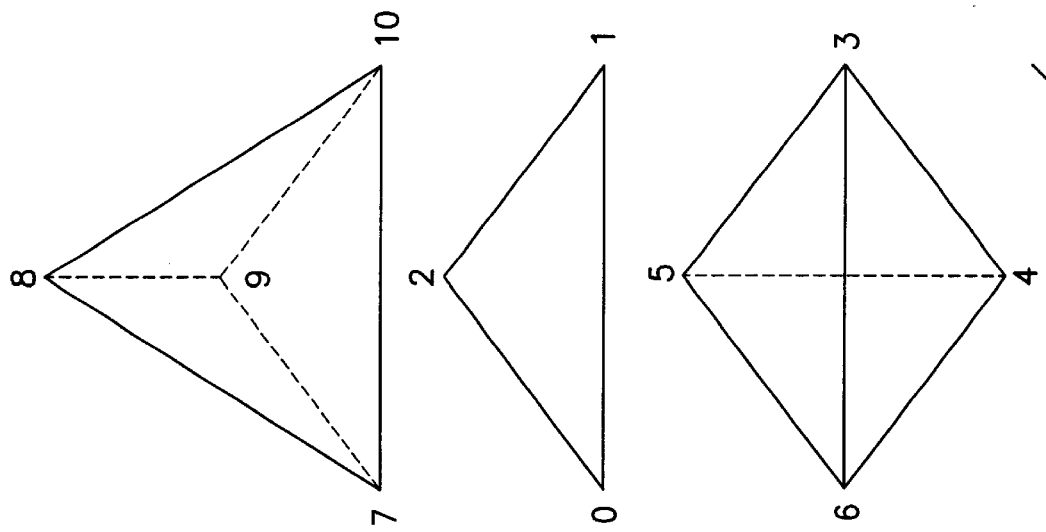
FIG. 1B depicts a conventional process for converting the tetrahedra of FIG. 1A to a manifold by cutting the non-manifold mesh.
Figure 1B:
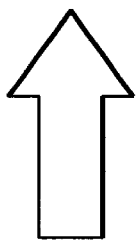
Figure 1B:
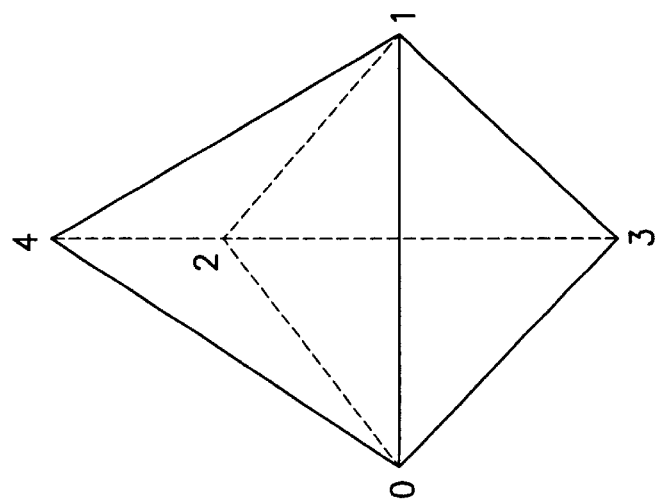
Figure 1C:
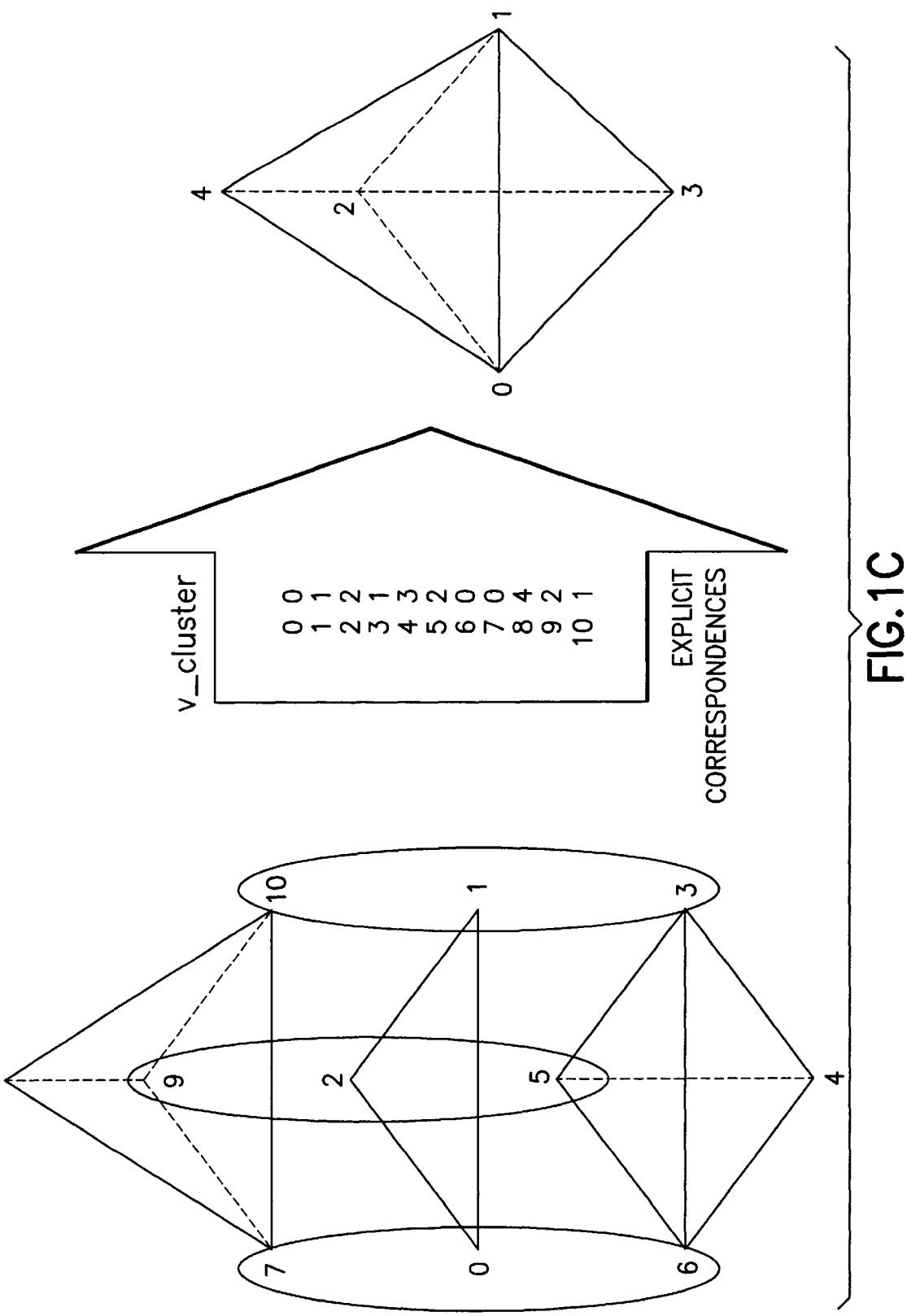
FIG. 1C represents the non-manifold mesh as a manifold mesh together with a vertex clustering in accordance with an embodiment of this invention.
Figure 5A:
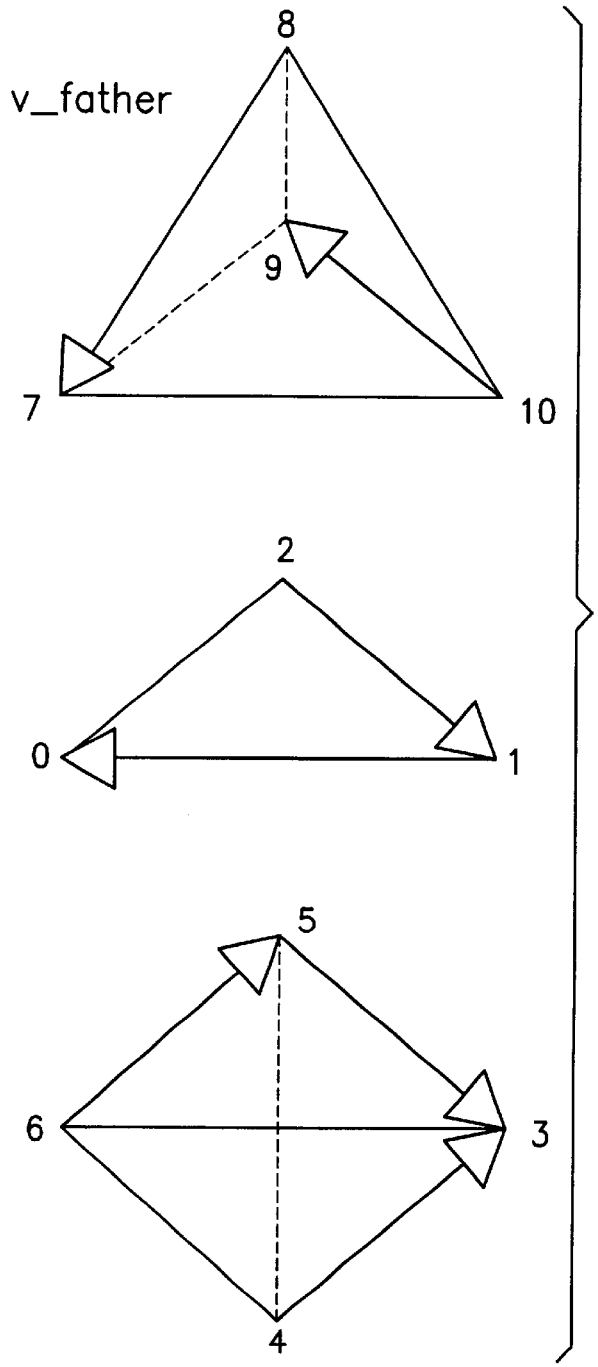
Figure 5B:
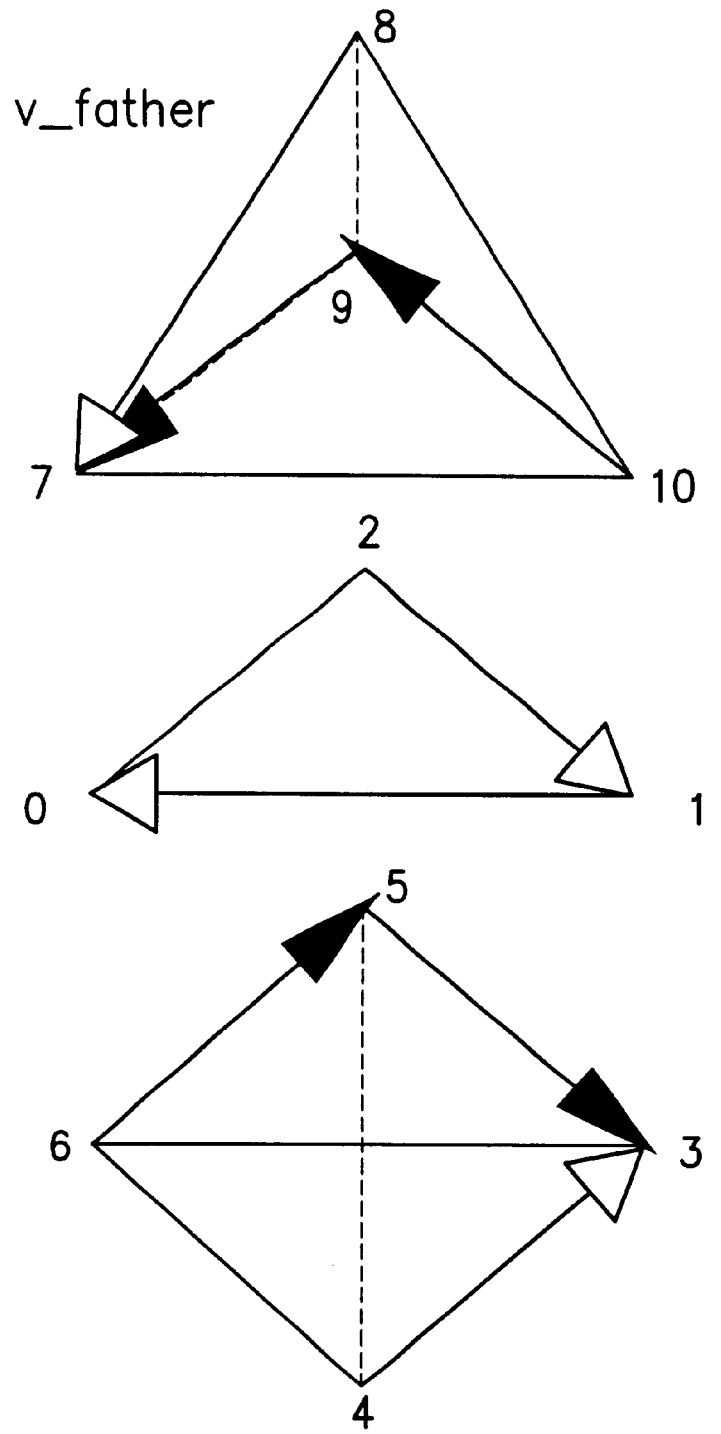

Referring again to FIG. 1A, an exemplary non-manifold model is shown. The model 6100 contains two tetrahedra that share a triangular face. The list of faces is also shown. FIG. 1B depicts the method of U.S patent application Ser. No. 08/840,001, entitled "Method To Convert Non-Manifold Polyhedral Surfaces Into Manifold Surfaces", and previously incorporated by reference. Referring now as well to FIG. 1C, in one embodiment of the present invention, the v_cluster clustering array is transmitted (e.g., over the network 1040 of FIG. 10) using explicit correspondences.

Referring again to FIGS. 5A–5D, it is shown that the exemplary v_cluster clustering array of FIG. 1C can be encoded using only the four stitching commands (shown in FIG. 8) that are employed to advantage by the preferred embodiment of the present invention.

Based on the foregoing it can be appreciated that the inventors have taught novel methods and apparatus for compressing a non-manifold mesh, as well as for encoding and decoding a non-manifold mesh. The inventors have also taught a novel computer program that is embodied on a computer-readable medium for providing a program that is capable of executing a method for compressing a non-manifold mesh. In this case the computer program, which may be read and executed by the system 1000 of FIG. 10, includes a code segment for converting the non-manifold mesh to a manifold mesh, including the storage of information on how to cluster vertices; a code segment for compressing the manifold mesh; and a code segment for compressing the information on how to cluster the vertices.

Also taught is a novel bit-stream that is conveyed between at least two points through a data communications network, such as the network 1040 shown in FIG. 10. The bit-stream conveys an encoded non-manifold polygonal mesh that has been converted to manifold polygonal meshes. In accordance with as aspect of this invention the bit-stream has a syntax that includes, for each vertex of the manifold polygonal mesh, a stitching command having a type selected from a set of types consisting of NONE, PUSH, GET or POP; a stitch length; a stack index; a differential length; a push bit; and a reverse bit.

It should further be noted that while typically the non-manifold polygonal mesh of interest will be converted to a plurality of manifold polygonal meshes, in certain cases the non-manifold polygonal mesh of interest may be converted to but one manifold polygonal mesh.

As such, it will be appreciated that while the invention has been particularly shown and described with respect to preferred embodiments thereof, those skilled in the art should comprehend that changes in form and details may be made therein without departing from the scope and spirit of the invention.

What is claimed is:

1. A method for compressing a non-manifold mesh representing a geometric object, comprising the steps of:
   converting the non-manifold mesh to at least one manifold mesh, the step of converting including a step of storing information on how to cluster vertices;
   compressing the at least one manifold mesh; and
   compressing the information on how to cluster vertices.

2. A method as in claim 1, and further comprising a step of storing the compressed at least one manifold mesh and the information on how to cluster the vertices.

3. A method as in claim 1, and further comprising a step of transmitting the compressed at least one manifold mesh and the information on how to cluster the vertices to a remote location.

4. A method as in claim 1, wherein the non-manifold mesh is represented in compressed form as a data structure comprised of a collection of data structures for a mesh connected component, each data structure for a mesh connected component comprising:
   a data structure for representing mesh connectivity;
   a data structure for representing stitches; and
   a data structure for representing mesh geometry as vertex coordinates as well as mesh properties per vertex/face/corner.

5. A method as in claim 1, and further comprising a step of transmitting the compressed at least one manifold mesh and the compressed information on how to cluster the mesh vertices to a remote location using a bit-stream syntax comprised of, for each vertex of the manifold mesh, a stitching command having a type selected from a set consisting of NONE, PUSH, GET and POP.

6. A method as in claim 5, wherein the bit-stream syntax is further comprised of a stitch length; a stack index; a differential length; a push bit; and a reverse bit.

7. A method for encoding a non-manifold polygonal mesh representing a geometric object, comprising the steps of:

representing the non-manifold polygonal mesh as at least one manifold polygonal mesh and a vertex clustering array obtained by cutting through singular edges and vertices of the non-manifold polygonal mesh;

representing each connected component of the manifold polygonal mesh with a vertex graph, a triangle tree and a triangle data record;

representing the information contained in the vertex cluster array as stitching information comprised a set of stitching commands each of the type NONE, PUSH, GET or POP, each stitching command having associated data;

applying the stitching information to a vertex cluster look-up table that describes a relation between polygon boundary loop nodes and mesh vertices; and encoding the stitching information in a bit-stream according to a predetermined bit-stream syntax.

8. A method as in claim 7, wherein the bit-stream syntax is comprised of, for each vertex of the manifold polygonal mesh, one of the stitching commands having the type NONE, PUSH, GET or POP; a stitch length; a stack index; a differential length; a push bit; and a reverse bit.

9. A method as in claim 7, wherein in the step of representing the non-manifold polygonal mesh as a manifold polygonal mesh and a vertex clustering array has the faces of two polygonal meshes in one-to-one correspondence, and the vertex clustering array assigns each vertex of the manifold polygonal mesh to its corresponding vertex in the non-manifold polygonal mesh before the cutting process.

10. A method as in claim 9, wherein the vertex clustering array is represented as an array with as many elements as vertices in the manifold polygonal mesh.

11. A method as in claim 7, wherein in the step of representing each connected component of the manifold polygonal mesh with a vertex graph, a triangle tree, and a triangle data record, an order of connected components and an order of a traversal of vertex trees spanning vertex graphs determines a global order of traversal, represented as a vertex traversal array, and wherein parent-child relationships are represented as a vertex father array.

12. A method as in claim 11, wherein in the step of representing the information contained in the vertex cluster array as stitching information, the vertex traversal array represents a permutation of the vertices, which is used to convert encoder vertex indices to decoder vertex indices.

13. A method as in claim 7, wherein in the step of applying the stitching commands to a look-up table the obtained information is used later to keep track of visited vertices in the triangle data record.

14. A method as in claim 8, and further comprising a step of decoding the bit-stream syntax by the steps of:

decoding manifold connected components;

decoding the stitch information;

applying the decoded stitch information to the vertex cluster look-up table that describes the relationship between simple polygon boundary loop nodes and mesh vertices; and decoding mesh geometry and mesh properties per vertex/face/corner.

15. A computer program embodied on a computer-readable medium for providing a program that is capable of executing a method for compressing a non-manifold mesh, comprising:

a code segment for converting the non-manifold mesh to at least one manifold mesh, including storing information on how to cluster vertices;

a code segment for compressing the at least one manifold mesh; and a code segment for compressing the information on how to cluster vertices.

16. A bit-stream conveyed between at least two points through a data communications network, said bit-stream conveying an encoded non-manifold polygonal mesh that has been converted to at least one manifold polygonal mesh, said bit-stream having a syntax comprised of, for each vertex of the manifold polygonal mesh, a stitching command having a type selected from a set of types consisting of NONE, PUSH, GET or POP; a stitch length; a stack index; a differential length; a push bit; and a reverse bit.

17. A program storage device readable by a machine, tangibly embodying a program of instructions executable by the machine to perform method steps for encoding a non-manifold polygonal mesh, said method steps comprising:

representing the non-manifold polygonal mesh as at least one manifold polygonal mesh and a vertex clustering array obtained by cutting through singular edges and vertices of the non-manifold polygonal mesh;

representing each connected component of the at least one manifold polygonal mesh with a vertex graph, a triangle tree, and a triangle data record;

representing the information contained in the vertex cluster array as stitching information comprised a set of stitching commands each of the type NONE, PUSH, GET or POP, each stitching command having associated data;

applying the stitching information to a vertex cluster look-up table for describing a relation between polygon boundary loop nodes and mesh vertices; and encoding the stitching information in a bit-stream according to a predetermined bit-stream syntax, the bit-stream syntax being comprised of, for each vertex of the manifold polygonal mesh, one of the stitching commands having the type NONE, PUSH, GET or POP; a stitch length; a stack index; a differential length; a push bit; and a reverse bit.

18. A computer system for compressing a non-manifold mesh, comprising:

data storage for storing a representation of a non-manifold mesh;

a data processor coupled to the data storage and operating under the control of a program for converting the non-manifold mesh to at least one manifold polygonal mesh and storing information on how to cluster vertices; said data processor further operating to compress the at least one manifold polygonal mesh and to also compress the information on how to cluster vertices; and a communications network interface coupled between said data processor and a communications network, said data processor further being operable for generating a bit-stream for conveying the encoded non-manifold polygonal mesh that has been converted to at least one manifold polygonal mesh, said bit-stream having a syntax comprised of, for each vertex of the manifold polygonal mesh, a stitching command having a type selected from a set of types consisting of NONE, PUSH, GET or POP.

19. A computer system as in claim 18, wherein said bit-stream syntax is further comprised of a stitch length; a stack index; a differential length; a push bit; and a reverse bit.

* * * * *